United States Patent [19]
Greenberg

[11] Patent Number: 5,710,793
[45] Date of Patent: Jan. 20, 1998

[54] ERROR SIGNAL QUANTIZATION METHOD AND HARDWARE FOR MIXED BLIND AND DECISION DIRECTED EQUALIZATION

[75] Inventor: Craig Bradley Greenberg, Sunnyvale, Calif.

[73] Assignee: National Semiconductor Corporation, Santa Clara, Calif.

[21] Appl. No.: 575,998

[22] Filed: Dec. 21, 1995

[51] Int. Cl.$^6$ ........................................... H04T 7/00
[52] U.S. Cl. .................. 375/232; 375/235; 364/724.2
[58] Field of Search .................. 375/229, 230, 375/231, 232, 233, 234, 235, 236, 344, 261, 266, 264; 364/724.19, 724.2; 333/28 R, 18; 370/206, 207, 215, 216, 241, 252, 522

[56] References Cited

U.S. PATENT DOCUMENTS

| | | | |
|---|---|---|---|
| 4,027,257 | 5/1977 | Perreault | 375/230 |
| 4,151,491 | 4/1979 | McRae | 375/235 |
| 4,562,425 | 12/1985 | Turner et al. | 375/261 |
| 4,630,287 | 12/1986 | Armstrong | 375/261 |
| 5,243,624 | 9/1993 | Paik et al. | 375/232 |
| 5,307,375 | 4/1994 | Wu et al. | 375/232 |
| 5,537,439 | 7/1996 | Choi | 375/232 |

Primary Examiner—Wellington Chin
Assistant Examiner—Huy D. Vu
Attorney, Agent, or Firm—Limbach & Limbach L.L.P.

[57] ABSTRACT

According to a first aspect, a novel method of performing an eight point quantization is developed. The eight point quantization consists of selecting one eight specific points depending upon the phase of the measured complex error signal. According to a second aspect, a novel method of performing eight-point quantization of an error signal by rotating a measured complex sample point by positive pi/8 and by negative pi/8. Two sign comparisons results in two control signals. These control signals used in conjunction with the signs of the real and imaginary parts of the variable being quantized results in all the information necessary to select one of eight equal and radially symmetric decision regions. According to a third aspect, an efficient hardware circuit implements the complex coefficient update algorithm using the quantization method according to the first aspect on the error signal. The coefficient update circuit on a per tap basis requires four adders, eight multiplexors, two negation units, and two barrel shifters (if a programmable adaptation constant is supported). The equalizer filter requires a four multiplier control circuit for supply the multiplexor select signals. According to a fourth aspect, a raw error threshold is developed which indicates that for sample points received within a threshold distance T from a constellation point, the error signal for the equalizer coefficient update circuit is the difference vector in the measured error signal and the constellation point.

41 Claims, 12 Drawing Sheets

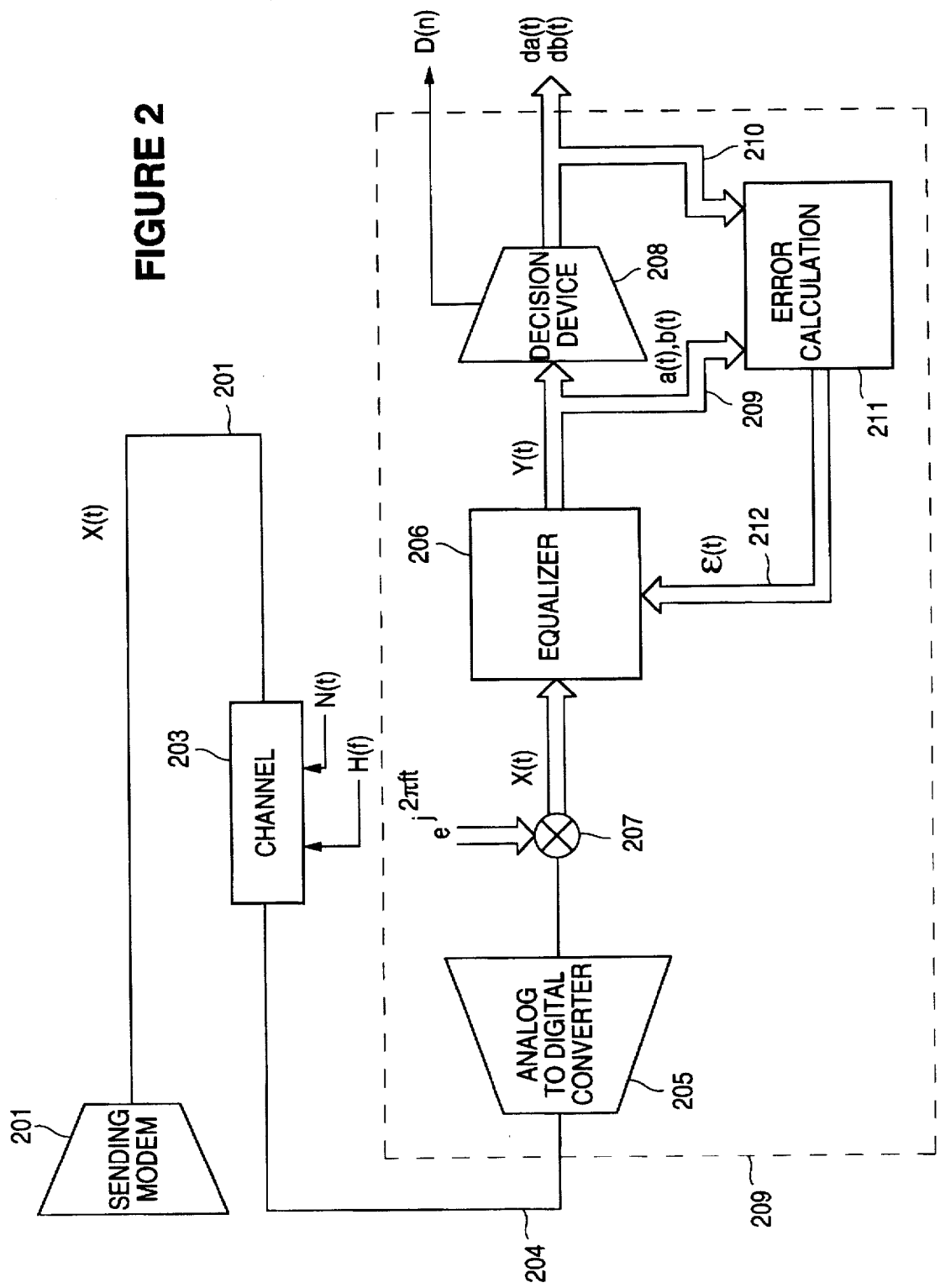

ERROR SIGNAL QUANTIZATION METHOD AND HARDWARE FOR MIXED BLIND AND DECISION DIRECTED EQUALIZATION

BACKGROUND OF THE INVENTION

1. Field of the Invention

The present invention relates to the field of data communication systems such as modems, where digital information is encoded, modulated, and transmitted as a complex analog signal. Specifically, the present invention relations to adaptive equalization of channel impairments incurred during transmission. Complex tap coefficient update circuits generally require a complex multiplier for each tap, thereby requiring an elaborate and large computation in each tap element. A simplified tap update algorithm is implemented by a tap coefficient update circuit having no multipliers, and implementing a novel eight-point quantization method of the measured complex error signal.

2. Discussion of the Related Art

Quadrature amplitude modulation (QAM) is a method for sending two independent signals simultaneously over the same frequency channel. A simple block diagram 100 for this process is shown in FIG. 1. In the case that digital information D(n) is to be transmitted, an encoder 101 generates a(t) and b(t) based upon the desired symbol D(n) to be transmitted during a given sample period t. The modulator 102 converts a(t) and b(t) into x(t) by multiplying a(t) by cos 2πft and b(t) by sin 2πft. Here, f is the transmitter carrier modulation frequency.

The signal x(t) is passed through a communication channel 103, which could be the airwaves, or could be a differential twisted pair signal. The demodulator 104 converts x(t) back into a(t) and b(t) by multiplying by cos 2πft and sin 2πft. Here, f is the receiver demodulation frequency, and ideally is equal to the modulation frequency used in the modulator 102. Low pass filters 105 and 106 eliminate undesired high frequency components at +2f and −2f resulting from the demodulation multiplication and thereby isolate the recovered signals a(t) and b(t). The decoder 107 performs the inverse function of the encoder 101 by translating the received complex sample a(t) +j b(t) into the digital symbol D(n).

FIG. 2 illustrates a transmission channel 203 which introduces noise N(t) and has a channel impairment H(f) which contributes to the received signal 204. A sending modem 201 transmits a modulated signal x(t) into the communication channel 203. After being altered by the channel, the received signal 204 typically goes through an analog to digital converter 205. The analog to digital converter output is demodulated by the carrier frequency by being multiplied by cos 2πft and sin 2πft by multiplier pair 207 to create a complex received sample X(t). An equalizer 206 is introduced into the receiver 209 processing to negate the effects of the channel impairment introduced by the transmission channel 203.

The equalizer takes the complex received sample X(t) as input, and receives a complex error signal ε(t) 212 as input. After being properly equalized to counteract the channel impairment, the equalizer output Y(t) is output to the decision device 208 and the error calculation unit 211. The decision device 208 uses the received real and imaginary parts a(t) and b(t) of the transmitted signal x(t) to decide which symbol D(n) was transmitted. Because of all the various sources of error, the received values of a(t) and b(t) will not likely exactly correspond to the values transmitted by the sending modem 201. Once the decision device 208 decides which symbol was transmitted, it outputs the values da(t) and db(t) which represent the exact values of a(t) and b(t) which were assigned to the received symbol by the encoding pattern. These signals da(t) and db(t) represent what the receiver 209 thinks the sending encoder 101 (in FIG. 1) should have generated if the receiver's decision device 208 were always correct and no noise or uncorrected channel impairment exists. In a noiseless environment with no uncorrected channel impairment in which N(t) were zero, a(t) should equal da(t), and b(t) should equal db(t). The complex input 209 and complex output 210 of the decision device 208 are input into an error calculation unit 211 that computes the error signal εt. The error calculation circuit 211 supplies the equalizer 207 with the receiver's perceived error εt 212 due to uncorrected channel impairment.

The isolated signals a(t) and b(t) can be plotted along the x-axis and y-axis of a cartesian coordinate system. If this coordinate system is the complex plane, then a(t) is the real part and b(t) is the imaginary part of a complex signal.

Digital information makes use of digits which are symbols having a discrete finite number of values. In the simplest case, a binary digit can have either a value of 0 or 1. However, any communication medium used to transmit a 0 or 1 will have a continuous function domain with regard to the medium attribute which is used to encode the digital bit of information. For example, if +5 volts is used to encode the symbol 1 while 0 volts is used to encode the symbol 0 then a 5 volts represents 1 and 0 volts represents 0 on the communication medium. But signals on a communication medium are real number (continuous) voltages which have a continuous domain and a potentially infinite number of values. The medium's voltage can be 0 volts, 5 volts, or anywhere in between (or above +5 volts or below 0 volts) at any given time.

The receiver of a digital signal therefore must translates the continuous domain signal on the communication medium into a discrete symbol having a finite number of types. One way to encode a bit or binary digit is if the communication medium has a positive voltage that represents 0 and if it has a negative voltage that represents 1. In this case the voltage 0 would represent the transition threshold from one symbol to the other. The following equation represents how a continuous real variable ε can be quantized so as to represent a single binary digit of information.

$$\text{Sign } \epsilon = \left\{ \begin{array}{l} +1 \text{ for } \epsilon \geq 0 \\ -1 \text{ for } \epsilon < 0 \end{array} \right\} \text{ for real } \epsilon$$

While this approach is simple and straightforward and can be implemented with a simple analog comparator on the receiving end of the transmission medium, only one binary digit of information is communicated per symbol. Because it is desirable to communicate symbols having more than two possible values through an analog transmission medium, typically a set of symbols is defined where each symbol includes more than one bit of information. In the following equation, the variable ε is complex, thus it has a real part $\epsilon_R$ and an imaginary part $\epsilon_I$.

$$\epsilon = \epsilon_R + j\epsilon_I$$

$$j = \sqrt{-1}$$

Using two analog comparators (one for the imaginary part and one for the real part), ε can be quantized to a symbol representing two bits using the following equation.

Sign $\epsilon$=Sign $\epsilon_R$+j Sign $\epsilon_I$ for complex $\epsilon$

The complex conjugate of $\epsilon$ is represented by the following equation.

$\epsilon^* = \epsilon_R - j\epsilon_I$ =complex conjugate of $\epsilon$

In the transmission of digital signals over analog transmission media, quadrature amplitude modulation permits a finite number of discrete points in the complex plane to correspond to digital numbers or symbols. FIG. 3 illustrates an example of one possible set of points and the digital symbol each point encodes. Each point represents a symbol in the digital alphabet which can be transmitted. The set of points is called a constellation. Quadrature amplitude modulation generally uses rectangular constellations, where the points are in a rectangular lattice, although non-rectangular constellation points can be used as well. The constellations are classified according to the number of bits M per symbol that they can convey. In order to convey M bits, the number of points in the constellation is $2^M$.

Directed by a sampling clock, the decision device 208 samples a(t) and b(t). Each sample taken represents a point in the complex plane. If the system is correctly demodulating x(t), and if no noise has distorted the signal in transmission, the sampled point will land exactly on one of the points 301 of the constellation 300. In the likely event that noise has distorted the signal at some point in the system, the received sample point will not land exactly onto any one of the constellation points 301. If random white noise is assumed, a guassian distribution of samples centered around each constellation point 301 will be produced.

Using some decision criteria, the decision device 208 determines which symbol was transmitted for each sample. Once the determination has been made as to which symbol was transmitted, the decision device outputs those bits D(n) representative of the determined symbol. FIG. 4 illustrates rectangular decision regions bounded by lines 401. The inner four areas are closed; the output four corner areas extend infinitely in both the real and imaginary dimensions; and the side eight areas extend infinitely in either the real or the imaginary dimension. Each of the sixteen regions has a constellation point 403 indicating the receiver translated signal that the decision device 208 will interpret if the received sample is within the corresponding area.

FIG. 4 also illustrates the effects of a minor channel impairment in a noiseless environment. A tightly bunched constellation of received symbols 402 illustrate that the received symbols are skewed by a non-random channel impairment. In a noisy environment, the received points would appear more as a cluster, as illustrated in the lower right constellation point in FIG. 4. By aligning the received sample points to the correct constellation points 403, the probability of a transmitted symbol being received in an incorrect decision region is minimized since the cluster of points is moved such that no cluster is very near to any one of the decision region boundaries 401. If a more severe non-random channel impairment (for example, described with reference to FIG. 12) influences the transmitted signal, it will be difficult if not impossible for the decision device to make the correct decisions; thus, symbols will be misinterpreted, and incorrect data will be output by the receiver.

FIG. 5 illustrates constellation of four symbols. The analog input signal $\epsilon$ is complex therefore it has a real part and imaginary part. The real part is shown along the x axis while the imaginary part is shown along the y axis. If both the real part and imaginary part of the analog signal are positive, then the symbol 501 in the first quadrant is received. If the real part is negative and the imaginary part is positive, then the symbol 502 in the second quadrant is received. If both the real and imaginary parts are negative, then the symbol 503 in the third quadrant is received. And if the real part is positive and the imaginary part is negative, then the symbol 504 in the fourth quadrant is received. This allows for the transmission of two binary digits per symbol. A sign detection operation is performed on the real part and the imaginary part to easily quantize the received input $\epsilon$ into a quantized output symbol. If the real and imaginary parts of $\epsilon$ are stored as floating point numbers or as any type of signed number, then the sign bit of the number itself contains the desired information needed for quantization to a constellation point. In FIG. 5, the decision regions are bounded by the x and y axes themselves.

Typically constellations having more than four points are employed. For example, FIG. 4 shows a constellation of sixteen points 403, but where there are four symbols per quadrant. Quantization to more than four points requires more than a simple sign detection on the real part and the imaginary part. While the transmitter typically transmits its symbol exactly on the desired location of the complex plane for which that symbol is assigned, channel impairments along the communication medium can change the received sample so that it no longer lies directly on top of the constellation point. Gaussian white noise independently contributing to both the real and imagery parts of the received symbol creates a probability distribution of any received symbol. Therefore, the constellation design tries to separate the symbol points by enough space such that a transmitted symbol even after the addition of guassian white noise in the reel and imaginary parts will nonetheless place the received signal in the correct decision region. This constellation design minimizes the probability that the received signal will be in the incorrect decision region and the digital symbol will be incorrectly translated and incorrectly received.

However, channel impairments are typically not random gaussian noise, but rather are non-random influences on the received sample, as illustrated in FIG. 4 by the predictable displacement of the received symbols 402 from their corresponding transmitted symbols 403. Typically, an equalization filter 206 (in FIG. 2) is used to alter the received signal so that the equalizer outputs correspond to the desired constellation points. Therefore, the equalization filter 206 compensates non-random channel impairments.

However, upon initialization of communications, the nature of the channel impairments are not known; therefore, the equalization filter 206 must adaptively deduce channel impairments and provide a transfer function which compensates for the channel impairments without any prior knowledge of the channel impairments.

FIG. 6 illustrates a FIR (Finite Impulse Response) filter which can be used as an equalizer 206. FIG. 6A illustrates the structure of a filter tap 601. The filter tap 601 includes a complex sample input $X_{i-1}$, delay element 602, complex coefficient $W_i$ 603, complex multiplier 604, and real and imaginary adder pair 605. The output of delay element 602 is the previous sample point. In an FIR filter having N taps, then N sample points contribute to the output Y at any given time as specified by the complex weighting constants $W_i$ through $W_N$. FIG. 6B shows how multiple taps are linked together to form a tapped delay line for the samples X, and a structure that accumulates the weighted products which contribute to the output Y.

FIG. 6C illustrates the signal flow of the architecture of the tapped FIR filter structure 606. In an N tap FIR filter, the first tap 607 receives a complex sample point X(t). The real and imaginary parts of the Y input 608 of the first filter tap 607 are connected to zero. N sample periods later, the complex sample point X(t) has been shifted to the Nth and final filter tap 609. The following equation represents the function implemented by an N tap FIR filter. Because the sample points X are shifted along a tapped delay line, $X_0$ is X(t) for period t. $X_i$ is X(t−i). Therefore the last filter tap 609 contains the sample X(t−N), which is the received sample for N periods ago. For simplicity, the variables will be represented relative to the FIR filter using the i subscript, rather than relative to the time t during which samples were received.

$$Y = \sum_{i=1}^{N} X_i \cdot W_i$$

The output Y of has real and imaginary parts as follows.

$$Y = Y_R + jY_I$$

Each of the N sample points $X_i$ in the tapped delay line is complex as shown below.

$$X_i = X_{Ri} + jX_{Ii}$$

Each tap coefficient $W_i$ is complex as shown below.

$$W_i = W_{Ri} + jW_{Ii}$$

The FIR filter output is thus expanded as follows.

$$Y = \sum_{i=1}^{N} (X_{Ri} + jX_{Ii})(W_{Ri} + jW_{Ii})$$

As shown by the following equation, the computation of the real part of Y for each tap requires two multiplications and a subtraction, while the computation of the imaginary part of Y for each tap requires two multiplications and an addition.

$$Y = \sum_{i=1}^{N} [(X_{Ri}W_{Ri} - X_{Ii}W_{Ii}) + j(X_{Ii}W_{Ri} + X_{Ri}W_{Ii})]$$

FIG. 7A illustrates the notion that the coefficient generator 603 (in FIG. 6A) is configured to receive a complex error signal $\epsilon$ which allows the complex coefficients W to adaptively update according to the following equation.

$$W_i(t+1) = W_i(t) - \mu \cdot \epsilon(t) \cdot X_i^*$$

In FIG. 7A, the multiplication by $\mu$ is not shown and is presumed to be factored into the $\epsilon$ signal distributed to the tap 701. An error signal E having real and imaginary parts is multiplied by the complex conjugate of the sample point $X_i$ by complex multiplier 704 to produce an adjustment value 706. The following equation represents the complex multiplication necessary to generate the adjustment value.

$$\epsilon(t) \cdot X_i^* = (\epsilon_R + j\epsilon_I)(X_{Ri} - jX_{Ii})$$

By expanding and grouping the terms of the above equation, the complex multiplication of the error signal by each sample point results in the following computations which must be performed for each tap.

$$\epsilon(t) \cdot X_i^* = (\epsilon_R X_{Ri} + \epsilon_I X_{Ii}) + j(\epsilon_I X_{Ri} - \epsilon_R X_{Ii})$$

An accumulator adder pair 705 updates the current coefficient by adding the adjustment value 706 and storing the result in flip-flop 702 as $W_i$. FIG. 7B illustrates three cascaded filter taps of the kind shown in FIG. 7A. For each filter tap, a complex multiplier 707, 708, and 709 is necessary to compute the product of three subsequent sample points by the error signal. In terms of hardware, the tap architecture illustrated in FIG. 7B is very large and expensive because each complex multiplication within each filter tap coefficient update circuit includes four real multipliers and two adders. As illustrated in FIG. 7C, the full resolution of the error signal $\epsilon(t)$ is bussed to each filter tap 710, 711, 712, 713, 714, 715, and 716. Once again, the real and imaginary parts of the Y input 717 of the first filter tap 710 are connected to zero. For n bit operands, each of the four multipliers is $O(n^2)$ in size, while each adder is $O(n)$ in size; therefore, the complex multiplication within each filter tap is very expensive.

SUMMARY OF THE INVENTION

In a multi-tap adaptive equalizer for counteracting a non-random channel impairment of a communication modem, an error signal provides feedback as to how to update complex filter tap coefficients. The tap filter update equation normally requires a full complex multiplication within each filter tap. The preferred embodiment of the present invention efficiently uses adders and multiplexors to perform a novel eight point quantization method on an error signal in a coefficient update circuit of an equalizer circuit for correcting a channel impairment.

The all blind algorithm is robust on start up for many channel impairments, but has high misadjustments once convergence is achieved. The all decision directed algorithm is fast tracking and has low misadjustment after convergence, but is not robust in start up as it will not converge for many channel impairments.

According to a first aspect of the present invention, a novel method of performing an eight point quantization is developed. The eight point quantization consists of selecting one of the following eight points depending upon the phase of the measured complex error signal: (1.5,0) for $15\pi/8$ to $\pi/8$, (1,1) for $\pi/8$ to $3\pi/8$, (0,1.5) for $3\pi/8$ to $5\pi/8$, (−1,1) for $5\pi/8$ to $7\pi/8$, (−1.5,0) for $7\pi/8$ to $9\pi/8$, (−1,−1) for $9\pi/8$ to $11\pi/8$, (0,−1.5) for $11\pi/8$ to $13\pi/8$, and (1,−1) for $13\pi/8$ to $15\pi/8$.

According to a second aspect of the present invention, a novel method of performing eight-point quantization of an error signal by rotating a measured complex sample point by positive $\pi/8$ and rotating the measured complex sample point by negative $\pi/8$. The signs of the real parts resulting from the positive and negative rotations are compared. This comparison results in a control signal. The signs of the imaginary parts resulting from the positive and negative rotations are compared. This comparison results in another control signal. These control signals used in conjunction with the signs of the real and imaginary parts of the variable being quantized results in all the information necessary to select one of eight equal and radially symmetric decision regions. For example, quantization as in the first aspect is supported. The variable being quantized is represented as real and imaginary parts.

According to a third aspect of the present invention, an efficient hardware circuit implements the complex coefficient update algorithm using the quantization method according to the first aspect of the present invention on the error signal. The coefficient update circuit on a per tap basis requires four adders. eight multiplexors, two negation units, and two barrel shifters (if a programmable adaptation constant is supported). The equalizer filter as a whole requires a four multiplier control circuit for supply the multiplexor select signals.

According to a fourth aspect of the present invention, a raw error threshold is developed which indicates that for sample points received within a threshold distance T from a constellation point, the error signal for the equalizer coefficient update circuit is the difference vector in the measured error signal and the constellation point. When a sample point is received further than T from its constellation point, a blind algorithm is used. The raw error threshold T is programmable. Quantization of the error signal is performed to eight points according to the first aspect of the present invention. The error signal computation and selection is performed on a sample by sample basis, so that the statistics of the received samples determine which mode dominates. The present invention solves all of the problems of the related art while retaining all of the benefits.

BRIEF DESCRIPTION OF THE DRAWINGS

FIG. 2 illustrates a the sending, channel transmission, and receiver of a modulated signal having real and imaginary parts, where the channel introduces random noise and a non-random channel impairment into the modulated signal.

FIG. 12 also shows a large variance in the received sample points which correspond to the same transmitted symbol which was transmitted in the presence of a severe multi-path channel impairment.

The various aspects and advantages of the present invention, as illustrated in the Figures, will become more apparent from the Detailed Description of the Invention.

DETAILED DESCRIPTION OF THE INVENTION

Figure 8A:
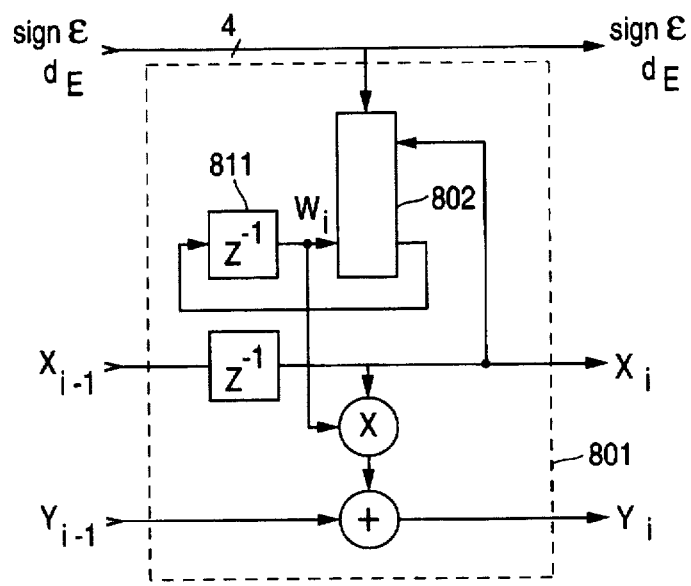
FIG. 8A is a block diagram of an FIR filter tap having a coefficient update circuit according to a third aspect of the present invention. The coefficient update circuit has four control signals as inputs rather than a complex error signal.
Figure 8B:
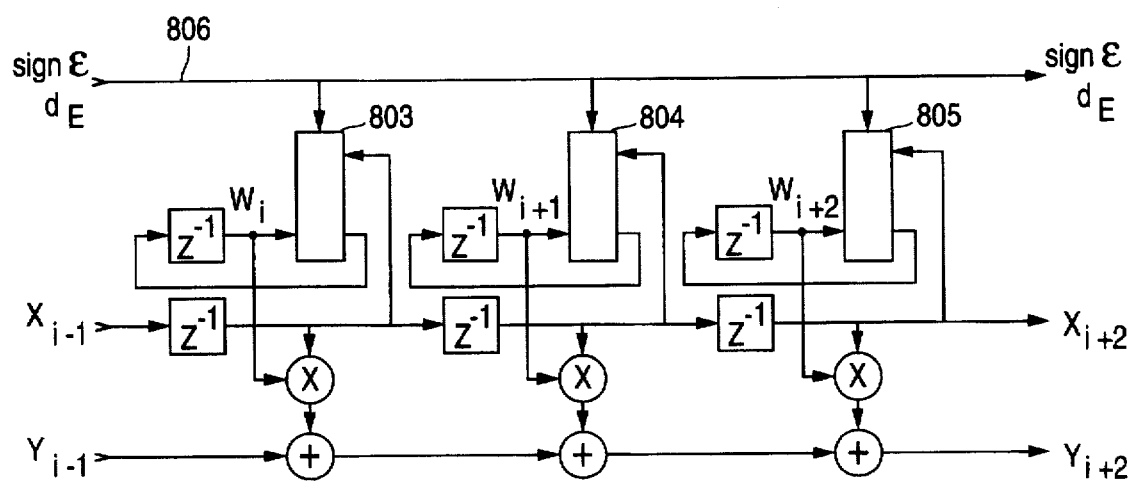
FIG. 8B illustrates a series of FIR filter taps according to the third aspect of the present invention such as illustrated in FIG. 8A.

FIG. 8A illustrates a filter tap 801 which has a coefficient update circuit 802 according to the present invention. The coefficient update circuit 802 according to the present invention takes the real and imaginary parts of $X_i$ and four control signals as inputs. The four control signals are the signs of the real and imaginary parts ε, and the rotated real and imaginary sign equality signals $d_{ER}$ and $d_{EI}$. The detailed logic equation of the rotated real and imaginary sign equality signals $d_{ER}$ and $d_{EI}$ will be discussed more fully below. FIG. 8A shows three filter tap sections with coefficient update circuits 803, 804, and 805. As shown in FIG. 8B, the same four control signals 806 are bussed to each of the coefficient update circuits 803, 804, and 805. The first filter tap 807 has the real and imaginary parts of its Y input 808 attached to zero. The equalizer filter output Y(t) is the Y output 809 of the final filter tap 810.

The filter tap update equation for an adaptive FIR is as follows.

$$W_i(t+1)=W_i(t)-\mu \cdot \epsilon(t) \cdot X_i^*$$

If the full resolution of the variables in the above equation are used, then the following computations must be performed to compute the complex error signal ε(t) multiplied by the complex conjugate of the sample $X_i$ for each filter tap i.

$$\epsilon(t) \cdot X_i^* = (\epsilon_R + j\epsilon_I)(X_{Ri} - jX_{Ii})$$

The above equation, rewritten to accumulate the real and imaginary parts, appears as below.

$$\epsilon_i X_i^* = (\epsilon_R X_{Ri} + \epsilon_I X_{Ii}) + j(\epsilon_I X_{Ri} - \epsilon_R X_{Ii})$$

Figure 7A:
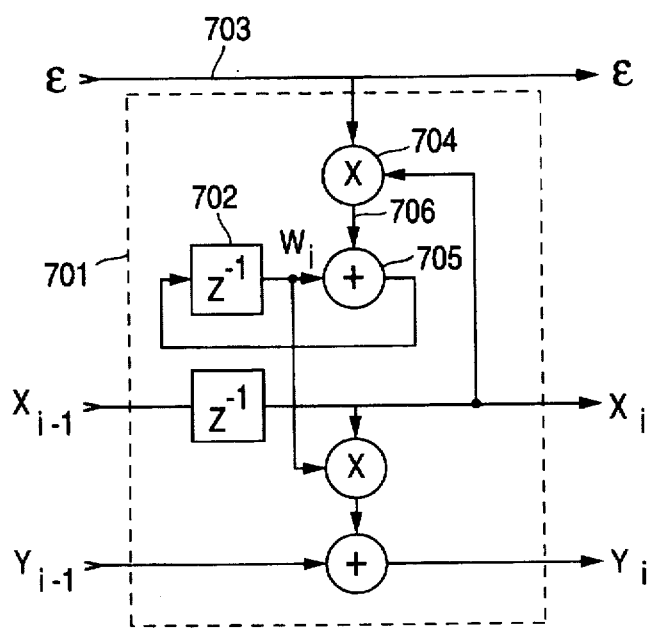
FIG. 7A illustrates one way of implementing an adaptive filter where the complex weighting coefficients are updated within each filter tap using the full resolution of the complex error signal within each tap. A complex multiplication is required in each tap.
Figure 7B:
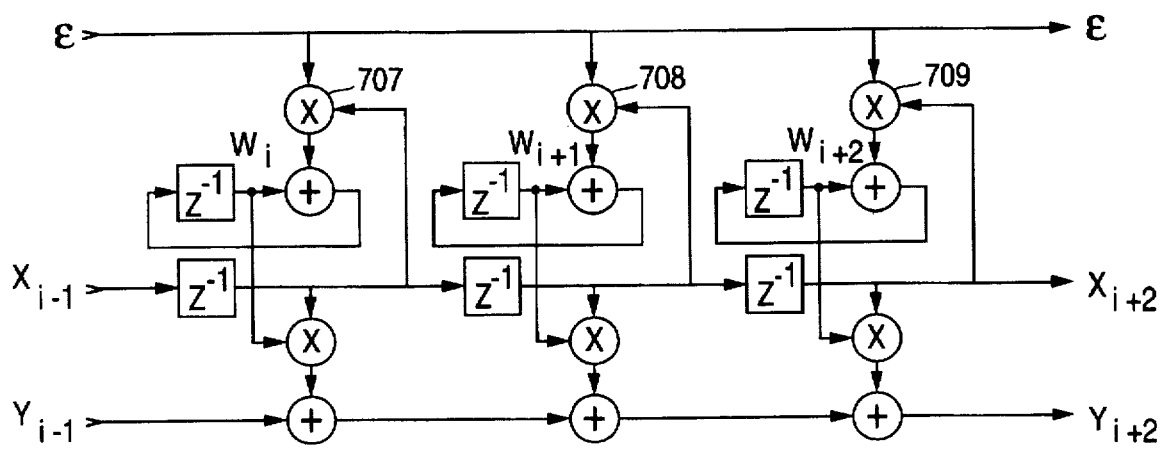
FIG. 7B illustrates a series of FIR filter taps such as illustrated in FIG. 7A.
Figure 7C:
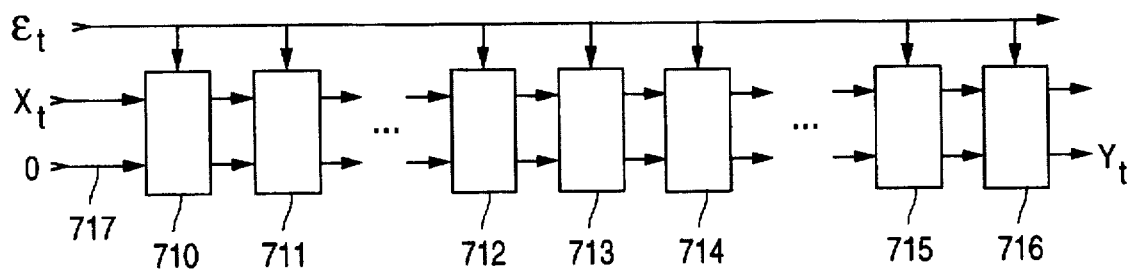
FIG. 7C is a block diagram of an N tap adaptive FIR filter equalizer which has a complex error signal input.

The implementation of the above equation involves four two-input multipliers and two adders. One multiplier is needed to compute each of the combinations of real part and imaginary part for the two complex inputs ε(t) and the tap filter sample point $X_i$ for that filter tap i. These four multipliers are required on a per tap basis, because each filter tap i contains a different sample point $X_i$. Thus, to fully support the above equation in hardware requires an update circuit within each filter tap with four multipliers; if sixteen taps are used, then sixty-four multipliers are required in the coefficient update circuits of the FIR equalizer filter shown in FIG. 7C.

According to a first aspect of the present invention, a method of implementing a simplified version of the coefficient update equation eliminates all multipliers within each tap filter coefficient update circuit. The simplified coefficient update equation is as follows.

$$W_i(t+1)=W_i(t)-2^{-m} \cdot Q8(\epsilon(t)) \cdot X_i^*$$

In the above equation, m is a whole number representing a right bit shift amount. The value of m is a programmable adaptation constant. A large m decreases the magnitude of each coefficient change in a series of coefficient updates, and therefore decreases the adaptation speed, but also decreases jitter due to noise. With a large value for m, the effects of misadjusting the coefficients incorrectly due to noise is minimized. Conversely, a small m increases the adaptation speed, but also increases the jitter, thereby increasing misadjustment due to noise.

The function Q8[ε(t)] represents a method of performing quantization of the error signal, so as to simplify an actual implementation of the coefficient update equation above within each filter tap i. Although a measured complex error signal ε(t) has high resolution error information, the quantized error signal Q8[ε(t)] has one of a eight discrete complex values. The quantized error signal has real and imaginary parts as shown in the following equation.

$$Q8[\epsilon(t)] = q_R + jq_I$$

The measured error signal has real and imaginary parts as shown by the following representation.

$$\epsilon(t) = \epsilon_R + j\epsilon_I$$

Figure 9:
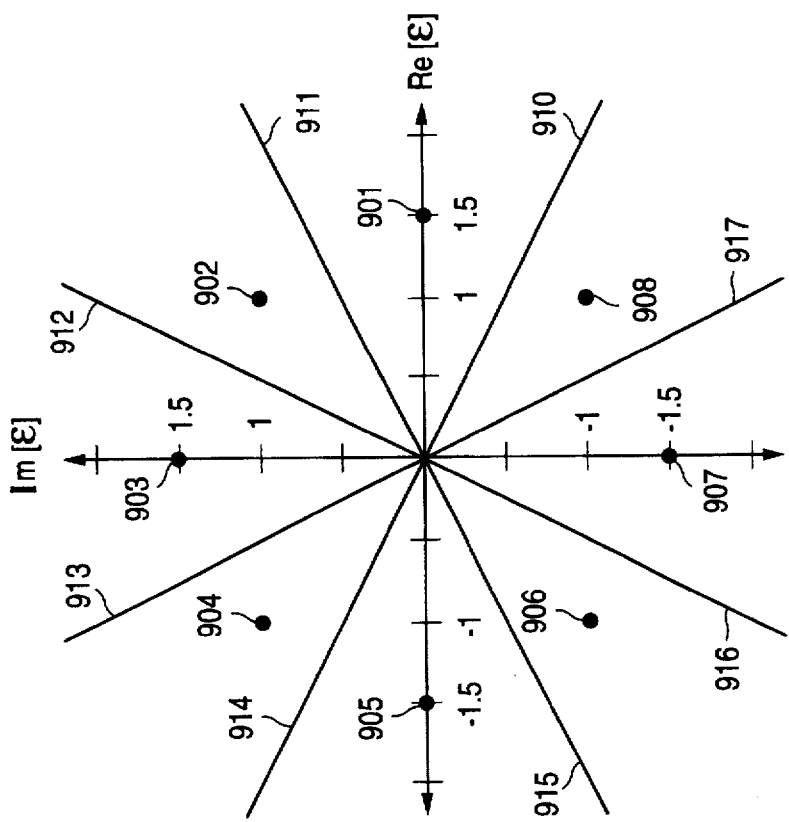
FIG. 9 illustrates the decision regions and constellation points according to a method of performing quantization of a measured complex error signal according to a first aspect of the present invention.
Figure 5:
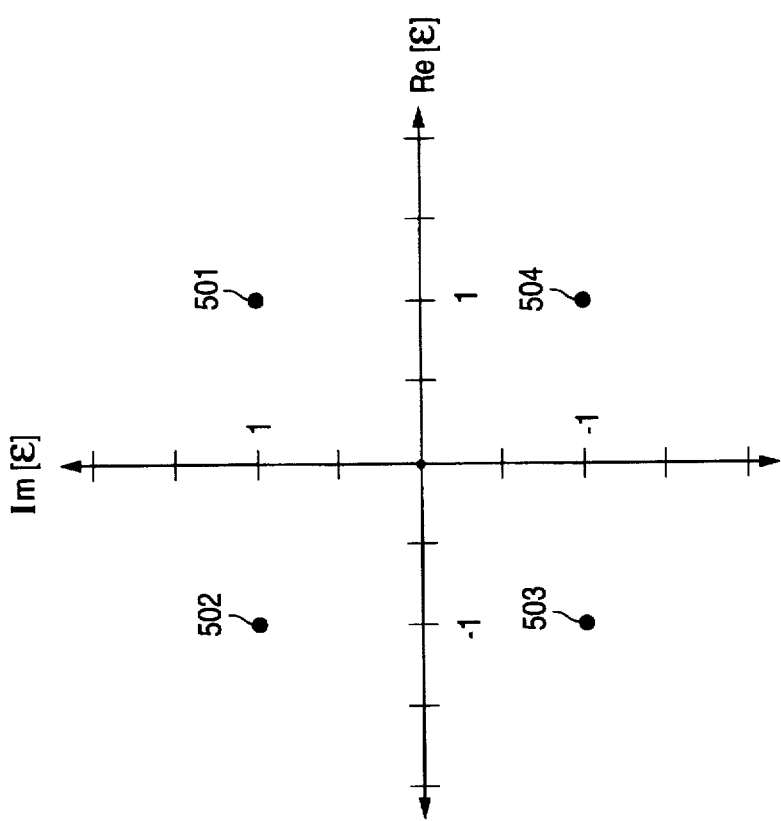
FIG. 5 illustrates the decision regions and constellation points of a four point quantizer of a complex error signal epsilon.
Figure 6A:
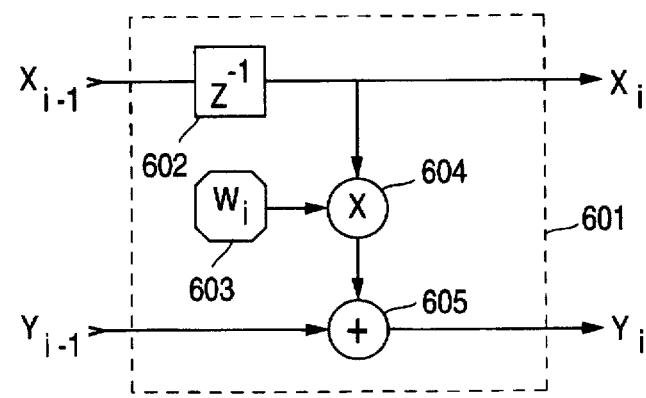
FIG. 6A illustrates an FIR (Finite Impulse Response) filter tap for delaying the input, weighting by a complex coefficient, and accumulating complex output components.
Figure 6B:
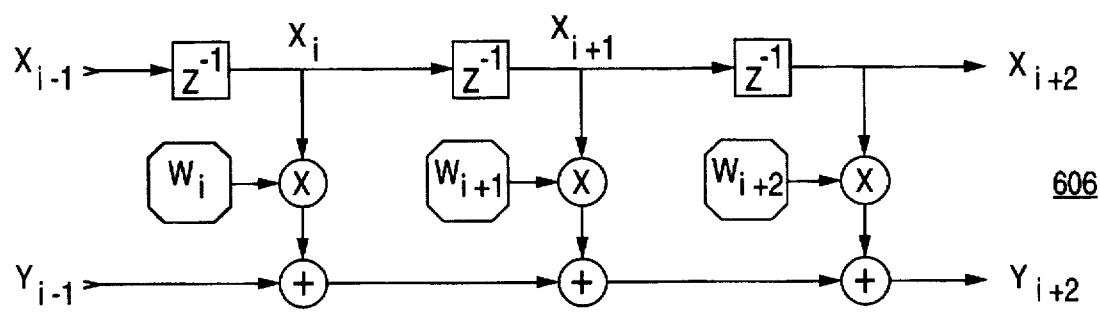
FIG. 6B illustrates a series of FIR filter taps such as illustrated in FIG. 6A.
Figure 6C:
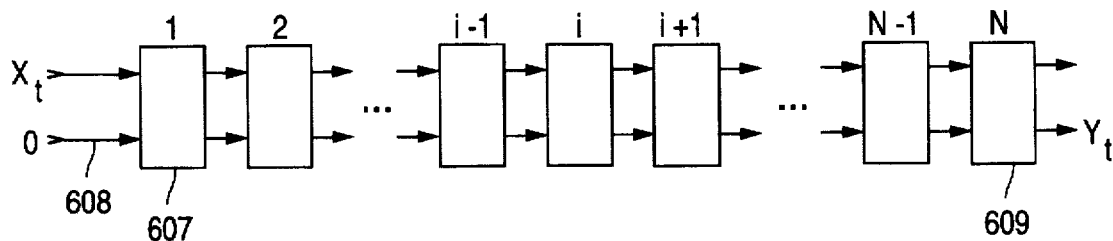
FIG. 6C is a block diagram of an N tap FIR filter equalizer.

FIG. 9 illustrates an eight point quantization constellation according to this first aspect of the present invention. In FIG. 9, a first constellation point 901 is at (1.5,0); the second constellation point 902 is at (1,1); the third constellation point 903 is at (0,1.5); the fourth constellation point 904 is at (−1,1); the fifth constellation point 905 is at (−1.5,0); the sixth constellation point 906 is at (−1,−1); the seventh constellation point 907 is at (0,−1.5); and the eighth constellation point 908 is at (1,−1). In the coefficient update equation, the error ε(t) signal is very important. The higher the resolution of the ε error signal the faster the tap coefficients will converge onto their correct values necessary to equalize the channel impairment. However, providing high resolution for the ε(t) signal becomes very expensive since each filter tap performs a complex multiplication of the ε(t) signal with the complex conjugate of $X_i$ which exists for each tap.

The present invention uses an eight point quantization of the measured error signal without the use of multipliers on a per tap basis. The first embodiment of the present invention involves quantizing the error signal to one of eight points. The eight quantization points are listed above. This quantization eliminates the information contained in the magnitude of the measured complex error signal and eliminates some of the precision in the phase of the measured complex error signal. With regard to the elimination of the magnitude information, a golfing analogy applies. The present invention operates on the philosophy that it is more important to move the filter coefficients in the correct direction of the complex plane than to move them the exact error amount during any given update iteration. By eliminating the magnitude information this means that more update recursions will be required to converge the coefficients close to their proper values, but it eliminates the need to carry the error magnitude information into each of the filter taps and hardware.

In FIG. 9, the ray 910 at 15π/8 is the lower boundary of a first area of the complex plane containing the first constellation point 901. The ray 911 at π/8 is the upper boundary of the first area, and is the lower boundary to the second area of the complex plane containing the second constellation point 902. The ray 912 at 3π/8 is the upper boundary of the second area, and is the lower boundary to the third area of the complex plane containing the third constellation point 903. The ray 913 at 5π/8 is the upper boundary of the third area, and is the lower boundary to the fourth area of the complex plane containing the fourth constellation point 904. The ray 914 at 7π/8 is the upper boundary of the fourth area, and is the lower boundary to the fifth area of the complex plane containing the fifth constellation point 905. The ray 915 at 9π/8 is the upper boundary of the fifth area, and is the lower boundary to the sixth area of the complex plane containing the sixth constellation point 906. The ray 916 at 11π/8 is the upper boundary of the sixth area, and is the lower boundary to the seventh area of the complex plane containing the seventh constellation point 907. The ray 917 at 13π/8 is the upper boundary of the seventh area, and is the lower boundary to the eighth area of the complex plane containing the eighth constellation point 908. The ray 910 is the upper boundary of the eighth area. All the rays above originate at the origin where the real and imaginary parts are both zero.

The following equation shows that the squared magnitudes of the eight constellation points are 2.25 for the points within areas 1, 3, 5, and 7, while the squared magnitude is 2 for areas 2, 4, 6 and 8.

$$|Q8(\epsilon)|^2 = \begin{cases} (1.5)^2 = 2.25 & \text{areas } 1, 3, 5, 7 \\ 2(1.0)^2 = 2.00 & \text{areas } 2, 4, 6, 8 \end{cases}$$

Although these magnitudes for the quantized error signal are not exactly equal, they are comparable, and the phase correction resolution introduced by the constellation point configuration of FIG. 9 according to the first aspect of the present invention is exactly π/4.

Figure 10:
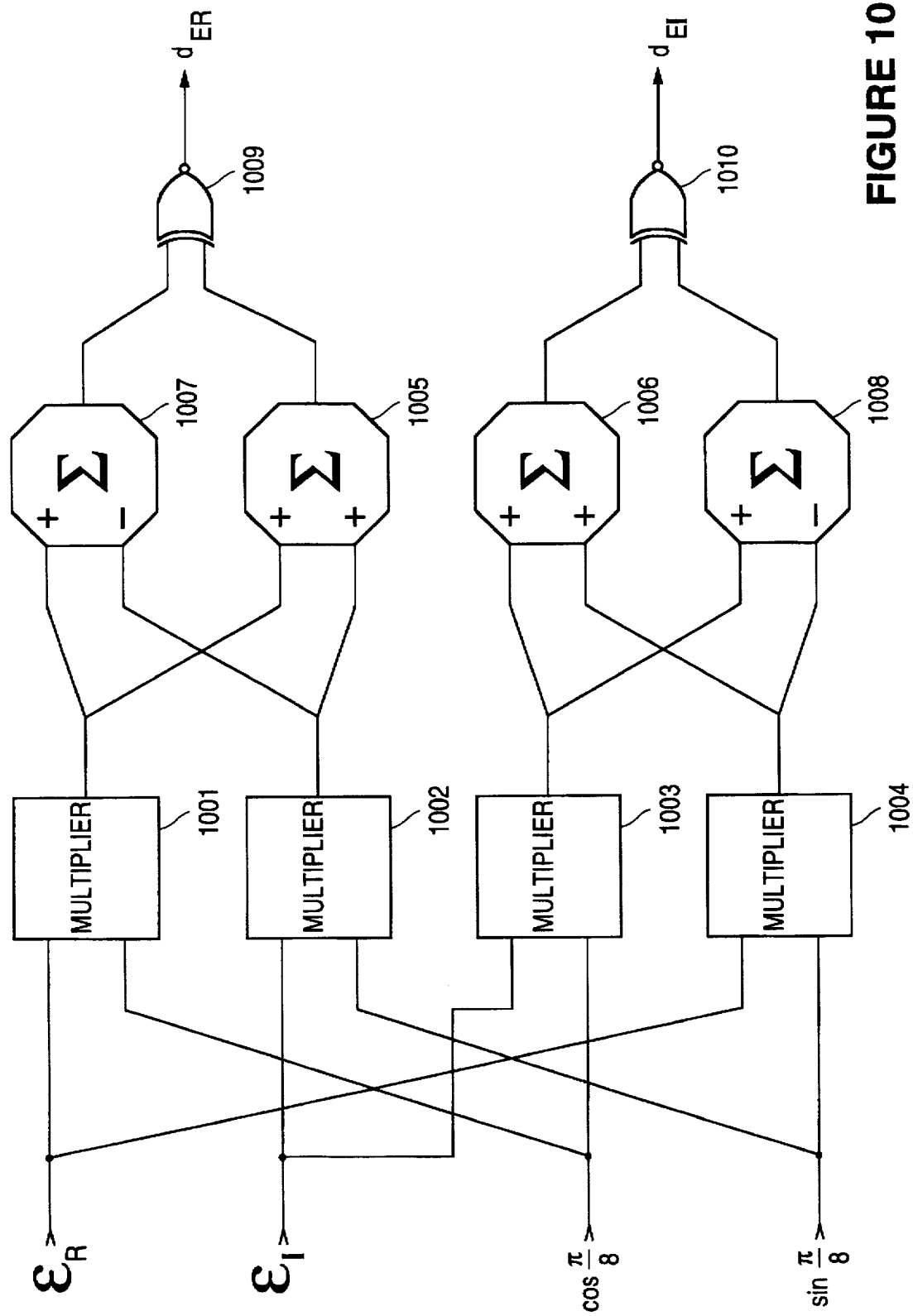
FIG. 10 illustrates a selection signal generator which computes two of the binary control signals that must be distributed to each tap coefficient update circuit according to the preferred embodiment of the present invention. The control signals generated in FIG. 10, in conjunction with the signs of the real and imaginary parts of the measured error signal, fully specify which of the eight constellation points is the be selected according to the present invention.

According to a second aspect of the present invention, a method of performing quantization of the measured complex error signal into one the eight areas of the complex plane each having π/4 angular width is disclosed. FIG. 10 illustrates a circuit which computes two control signals $d_{ER}$ an $d_{EI}$. The method according to the second aspect includes multiplying the measured complex error by $e^{jπ/8}$ and $e^{-jπ/8}$.

The equation below is Euler's theorem which shows the relationship between the real and imaginary parts of a complex number of unit magnitude to the angle φ of the complex number.

$$e^{jφ} = \cos φ + j \sin φ$$

The real part of the error signal rotated positively by π/8 in the complex plane is given in the following equation.

$$Re\{\epsilon \cdot e(t)^{j\frac{π}{8}}\} = \epsilon_R \cos\frac{π}{8} - \epsilon_I \sin\frac{π}{8} = d_{1R}$$

The imaginary part of the error signal rotated positively by π/8 in the complex plane is given in the following equation.

$$Im\{\epsilon \cdot e(t)^{j\frac{π}{8}}\} = \epsilon_I \cos\frac{π}{8} + \epsilon_R \sin\frac{π}{8} = d_{1I}$$

Combining the information from the real and imaginary parts of the positively rotated error signal, the first rotated error signal $d_1$ is represented as below.

$$d_1 = \epsilon(t) \cdot e^{jπ/8} = d_{1R} + jd_{1I}$$

The real part of the error signal rotated negatively by π/8 in the complex plane is given in the following equation.

$$Re\{\epsilon(t) \cdot e^{-j\frac{π}{8}}\} = \epsilon_R \cos\frac{π}{8} + \epsilon_I \sin\frac{π}{8} = d_{2R}$$

The imaginary part of the error signal rotated negatively by π/8 in the complex plane is given in the following equation.

$$Im\{\epsilon(t) \cdot e^{-j\frac{π}{8}}\} = \epsilon_I \cos\frac{π}{8} - \epsilon_R \sin\frac{π}{8} = d_{2I}$$

Combining the information from the real and imaginary parts of the negatively rotated error signal, the second rotated error signal $d_2$ is represented as below.

$$d_2 = \epsilon \cdot e^{-jπ/8} = d_{2R} + jd_{2I}$$

Sign operations are performed on the real and imaginary parts of the rotated error vectors $d_1$ and $d_2$, respectively, as follows.

$$\text{Sign } d_1 = \text{sign } d_{1R} + j \text{ sign } d_{1I}$$

$$\text{Sign } d_2 = \text{sign } d_{2R} + j \text{ sign } d_{2I}$$

A logic variable $d_{ER}$ is derived by comparing the signs of the real parts of the rotated error vectors $d_1$ and $d_2$ as follows.

$$d_{ER} = (\text{sign} d_{1R} = \text{sign} d_{2R}) \qquad d_{ER} = 0 \text{ or } 1$$

A logic variable $d_{EI}$ is derived by comparing the signs of the imaginary parts of the rotated error vectors $d_1$ and $d_2$ as follows.

$$d_{EI} = (\text{sign} d_{1I} = \text{sign} d_{2I}) \qquad d_{EI} = 0 \text{ or } 1$$

Referring to FIG. 10, four multipliers 1001, 1002, 1003, and 1004 are used to compute the products of the cosine π/8 and sine π/8 by the real part $\epsilon_R$ and imaginary part $\epsilon_I$ of the measured complex error signal ε(t). A sign detecting subtractor 1007 computes the sign of the real part resulting from a positive π/8 rotation of the measured complex error signal ε(t). Sign detection adder 1006 computes the sign of the imaginary part in the positive rotation. Sign detection adder 1005 computes the sign of the real part result of a −π/8 rotation of the measured complex error signal. Sign detection subtractor 1008 computes the sign of the imaginary part resulting from the negative rotation. The sign detecting adders 1005 and 1006 and subtractors 1007 and 1008 consist of all the logic necessary to produce only the carry output of a two-input propagate adder; therefore, a substantial savings of hardware is realized. An equivalence gate 1009 compares the signs of the real parts of the measured complex sample rotated positively and negatively by π/8.

The signal $d_{ER}$ is asserted when the real part signs are equal for positive and negative rotation. The signal dee is asserted if the sample is in either area 1, 2, 4, 5, 6, or 8. An equivalence gate 1010 compares the signs of the imaginary parts of the measured complex sample rotated positively and negatively by π/8. The gate 1010 produces a $d_{EI}$ signal which is asserted if the measured complex error sample ε(t) is in one of areas 2, 3, 4, 6, 7, and 8. If both $d_{EI}$ and $d_{ER}$ are asserted, the measured complex error sample is within one of areas 2, 4, 6, or 8; in this case, the signs of the real part $\epsilon_R$ and imaginary parts $\epsilon_I$ of the measured complex error sample ε(t) determines which area is selected; if $\epsilon_R$ and $\epsilon_I$ are positive, area 2 is selected; if $\epsilon_R$ is positive and $\epsilon_I$ is negative, area 8 is selected; if $\epsilon_R$ and $\epsilon_I$ are negative, area 6 is selected; and if $\epsilon_R$ is negative and $\epsilon_I$ is positive, area 4 is selected. If $d_{ER}$ is asserted and $d_{EI}$ is deasserted, areas 1 or 5 are selected depending upon the sign of the real part $\epsilon_R$ of the measured complex error signal; if the sign of $\epsilon_R$ is positive, area 1 is selected, and if the sign of $\epsilon_R$ is negative, area 5 is selected. If $d_{ER}$ is deasserted and $d_{EI}$ is asserted, area 3 or 7 is selected depending on the sign of the imaginary part $\epsilon_I$ of the measured complex error sample; if the sign of $\epsilon_I$ is positive, area 3 is selected, and if the sign of $\epsilon_I$ is negative, area 7 is selected.

Thus, according to a second aspect of the present invention, two control signals are generated $d_{ER}$ and $d_{EI}$ which represent whether or not the signs of the real part and imaginary part, respectively, are equal or not equal in the result of a rotation of the measured complex error signal positively and negatively by π/8. These control signals require four multiplications, two sign detecting additions, and two sign detecting subtractions, and two binary equivalence functions (XNOR). The signs of the real part and imaginary part of the measured complex error signal ε(t) provide all the information required to select one of the eight constellation points 901, 902, 903, 904, 905, 906, 907, or 908 illustrated in FIG. 9.

The table below shows the constellation point and corresponding area selected for the various values of $d_{ER}$, $d_{EI}$, sign $\epsilon_R$, and sign $\epsilon_I$ according to the preferred embodiment of the present invention.

| area | $q_R$ | $q_I$ | sign $d_{1R}$ | sign $d_{2R}$ | sign $d_{1I}$ | sign $d_{2I}$ |
|---|---|---|---|---|---|---|
| 1 | 1.5 | 0 | + | + | + | − |
| 1 | 1.5 | 0 | + | + | − | + |
| 2 | 1 | 1 | + | + | + | + |
| 3 | 0 | 1.5 | + | − | + | + |
| 3 | 0 | 1.5 | − | + | + | + |
| 4 | −1 | 1 | − | − | + | + |
| 5 | −1.5 | 0 | − | − | + | − |
| 5 | −1.5 | 0 | − | − | − | + |
| 6 | −1 | −1 | − | − | − | − |
| 7 | 0 | −1.5 | + | − | − | − |
| 7 | 0 | −1.5 | − | + | − | − |
| 8 | 1 | −1 | + | + | − | − |

According to a third aspect of the present invention, a tap coefficient update circuit which helps to implement the simplified coefficient update equation is implemented using multiplexors and shifters, but without any multiplier. The circuit implements the $Q8[\epsilon(t)] \cdot X_i^*$ function very efficiently.

The full resolution of the error signal $\epsilon$ times the complex conjugate of $X_i$ is given below.

$$\epsilon(t) \cdot X_i^* = (\epsilon_R + j\epsilon_I)(X_{Ri} - jX_{Ii}) = (\epsilon_R X_{Ri} + \epsilon_I X_{Ii}) + j(\epsilon_I X_{Ri} - \epsilon_R X_{Ii})$$

By substituting the sign of $\epsilon(t)$ for the error signal, the above equation becomes the following.

$$(\text{sign } \epsilon(t)) \cdot X_i^* = [(\text{sign } \epsilon_R) X_{Ri} +$$

$$(\text{sign } \epsilon_I) X_{Ii}] + j[(\text{sign } \epsilon_I) X_{Ri} - (\text{sign } \epsilon_R) X_{Ii}]$$

The quantization function according to the first aspect of the present invention is implemented as shown below. The terms shown on the left below are the same as those given above; however, the terms on the right below which include a multiplication by ½ are unique to the method according to the present invention.

Figure 11:
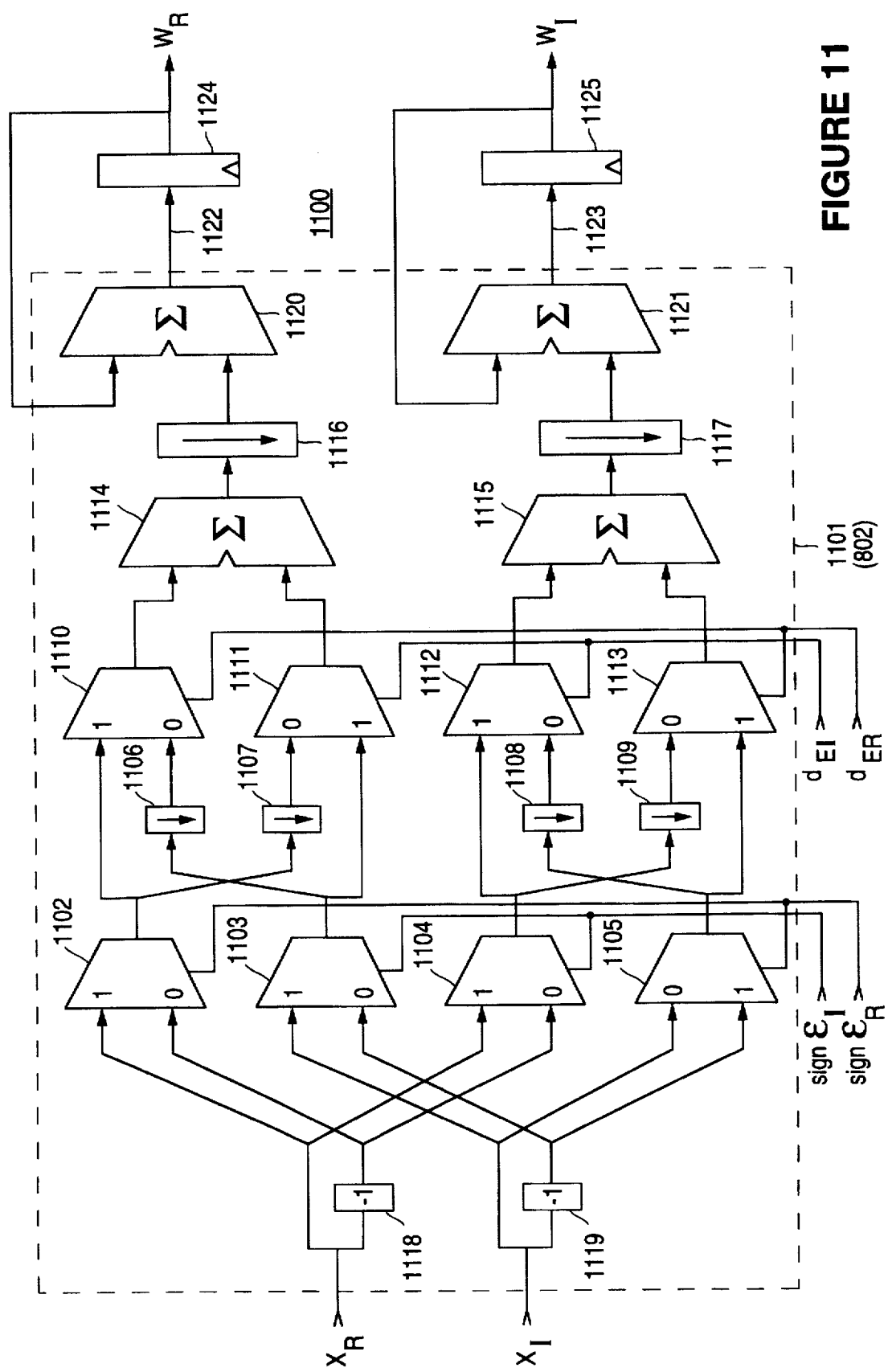
FIG. 11 illustrates a filter tap complex coefficient update circuit according to a third aspect of the present invention. The coefficient update circuit according to the present invention uses four adders and eight multiplexors to update the coefficient according to the constellation points specified by the first aspect of the present invention.

FIG. 11 illustrates the tap coefficient update circuit 1101 (802 in FIG. 8) that exists on a per tap basis in the circuits of $$Q8[\epsilon(t)] \cdot X^* = d_{ER}(\text{sign } \epsilon_R) X_R + d_{ER}\frac{1}{2} (\text{sign } \epsilon_I) X_I +$$

$$d_{EI}(\text{sign } \epsilon_I) X_I + d_{EI}\frac{1}{2} (\text{sign } \epsilon_R) X_R +$$

$$d_{EI}(\text{sign } \epsilon_I) X_R - d_{EI}\frac{1}{2} (\text{sign } \epsilon_R) X_I -$$

$$d_{ER}(\text{sign } \epsilon_R) X_I + d_{ER}\frac{1}{2} (\text{sign } \epsilon_I) X_R$$

Figure 8C:
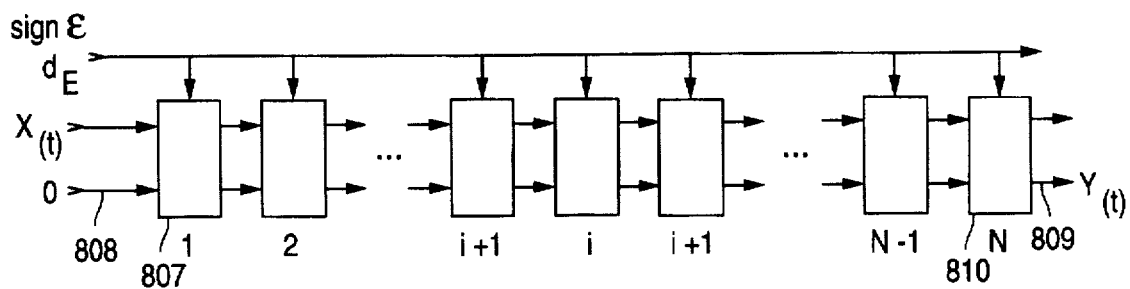
FIG. 8C is a block diagram of an N tap adaptive FIR filter equalizer which has four control signals, and where each tap coefficient update circuit is constructed according to the third aspect of the present invention.

FIGS. 8B and 8C. The circuit 1101 uses eight multiplexors, two adders, and two hardware shifters to implement the update equation. A real real first multiplexor 1102, real imaginary first multiplexor 1103, imaginary real first multiplexor 1104, and imaginary imaginary first multiplexor 1105 perform the sign $\epsilon(t) \cdot X^*$ operations. Real real right shifter 1106, real imaginary right shifter 1107, imaginary real right shifter 1108, and imaginary imaginary right shifter 1109 shift the components of sign $\epsilon(t) \cdot X^*$ by one bit position, thereby multiplying each of the components by ½. When the measured sample point $X_i$ is in one of areas 1, 3, 5, or 7, one of $d_{EI}$ and $d_{ER}$ is deasserted and one is asserted, so that adders 1114 and 1115 output 1.5 times the appropriate one of the components.

The table above illustrates the values for the control signals $d_{EI}$, $d_{ER}$, sign $\epsilon_I$, and sign $\epsilon_R$ for the constellation points selected when the measured complex error signal $\epsilon(t)$ is within the corresponding area of the complex plane. The real real second multiplexor 1110, real imaginary second multiplexor 1111, imaginary real second multiplexor 1112, and imaginary imaginary second multiplexor 1113 are controlled by the rotated real sign equality selection signal $d_{ER}$ and rotated imaginary sign equality selection signal $d_{EI}$.

A real component right shifter 1116 is typically a barrel shifter and performs a right shift of the real adjustment component adder 1114 output (the real coefficient correction value) by m bits, where $2^{-m}$ is the adaptation constant of the update algorithm. Another right shifter 1117 multiplies the imaginary coefficient correction value from the imaginary adjustment component adder 1115 by the adaptation constant by right shifting m bits so as to multiply by $2^{-m}$.

The coefficient update circuit uses two negation units 1118 and 1119. The real component negation unit 1118 multiplies the real sample component $X_{Ri}$ by −1. The imaginary component negation unit 1119 multiplies the imaginary sample component Xi by −1. If Xr and Xi are two's complement numbers, Then the negation units 1118 and 1119 are implemented as an inverter and incrementer.

The coefficient update circuit 1101 according to the third aspect of the present invention further includes a real coefficient correction adder 1120 and an imaginary coefficient correction adder 1121. The real coefficient correction adder 1120 adds the current real coefficient to the output of the right shifter 1116 (the scaled real coefficient correction value) to produce an updated real coefficient value output 1122. The imaginary coefficient correction adder 1121 adds the current imaginary coefficient the output of the right shifter 1117 (the scaled imaginary coefficient correction value) to produce an updated imaginary coefficient value output 1123. Flip-flops 1124 and 1125, together, constitute the delay element 811 shown in FIG. 8A.

The circuit shown in FIG. 11 executes the coefficient update equation below very efficiently requiring only eight multiplexors, four adders, two negation units, and two right barrel shifters (if the adaptation constant is to be programmable) per tap coefficient update circuit.

$$W_i(t+1) = W_i(t) - 2^{-m} \cdot Q8(\epsilon(t)) \cdot X_i^*$$

The control circuitry shown in FIG. 10 is implemented one time for the entire N tap equalizer filter.

Thus far, the nature of the error signal $\epsilon(t)$ has not been specified. According to a fourth aspect of the present invention, the error signal $\epsilon(t)$ is assigned a decision based difference when the sample is geometrically very close to one of the constellation points in the complex plane, and is assigned a blind based difference when the received sample point is distant from all of the constellation points.

Figure 12:
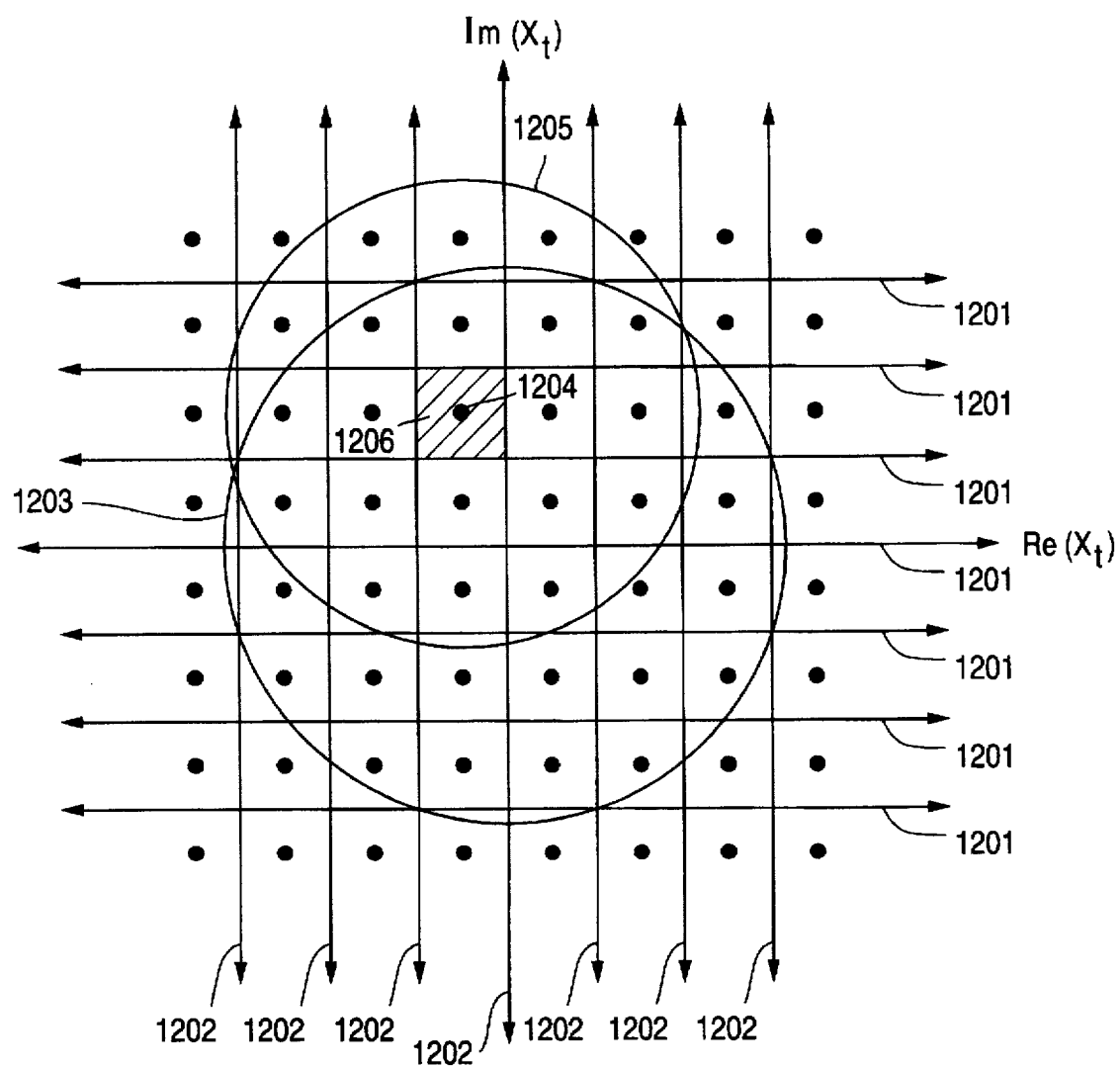
FIG. 12 illustrates a sixty-four point QAM constellation in the complex plane, its corresponding decision regions, and a blind algorithm's magnitude threshold which may be used when a severe uncorrected multi-path fading channel impairment renders decision directed correction algorithms ineffective.

FIG. 12 illustrates the effects of an uncorrected channel impairment. In FIG. 12, a sixty-four point rectangular QAM constellation is illustrated. The decision regions for the decision device 208 (in FIG. 2) are bounded by the horizontal lines 1201 and the vertical lines 1202. One common channel impairment is multi-path fading, which results in an attenuation on the signal path that varies with frequency. Multi-path fading can result in a large, frequency-dependent attenuation within the narrow signal bandwidth. The mechanism for multi-path fading is very similar to mode distortion in multi-mode optical fibers. For example, if the transmission channel is through the atmosphere, spatial variations in temperature, pressure, humidity, and turbulence may result in variations in the index of refraction, which allows two or more paths for electromagnetic waves to travel from transmitter to receiver. Second paths can exist as a result of reflection off physical objects, such as buildings or mountains. The effective path lengths will likely be different for the multiple paths, resulting in different transmission delays. The receiver will perceive the sum of the signals from the multiple paths; therefore, the signals in the multiple paths will interfere with one another, causing distortion of the received signal.

In FIG. 12, a multi-path channel impairment causes the received samples $Y(t)=a(t)+j\,b(t)$ to be received in clusters centered around the constellation points. For this particular type of channel impairment, although the received sample points are, on average, centered around the correct constellation points, the individual displacements of the individual sample points from the correct constellation points are large enough that most received points do not fall into the correct decision regions. For example, symbols which were transmitted as the constellation point 1204 are received in the complex plane as a distribution with a large variance, as illustrated by the circle 1205. In this case, only a small fraction of the received points would fall into the correct decision region 1206. Therefore, the multi-path channel impairment is so severe that it prevents correct translation of symbols by the receiver using the decision regions. Although random noise and a multi-path channel impairment may appear to have similar effects on the placement of the received sample points (that effect being that the distribution of sample points around each constellation point has a high variance), the multi-path channel impairment is not random, and therefore may be corrected. If incorrect decisions are being made, a blind algorithm can be used in which each received point's position relative to a magnitude threshold 1203 is used to compensate for the multi-path channel impairment, as will be discussed more fully below.

During the initialization of a channel transmission, the channel impairment renders the probability that a given received sample point X(t) will land on the correct decision region very small. Therefore, the digital data that is initially received is incorrect. In this case, a blind algorithm can be used to cause the adaptive filter to converge onto the correct adjustment value. The blind algorithm is described by the following equations.

$$\epsilon(t)=Y(t)\cdot[|Y(t)|^2-R_Q]\qquad\text{(Blind)}$$

By substituting YY* for the squared magnitude of Y, the following equation holds. From here on out, Y represents Y(t).

$$\epsilon(t)=Y\cdot(Y\cdot Y^*-R_Q)$$

By separating real and imaginary parts and performing the multiplication, the following equation results.

$$\epsilon(t)=Y\cdot(Y_R^2+Y_I^2-R_Q)$$

According to the blind algorithm, the error signal is the output Y scaled by the difference between the squared magnitude of Y and a predetermined scaler $R_Q$, as shown below.

$$\epsilon(t)=(Y_{Rt}+jY_{It})\,(Y_{Rt}^2+Y_{It}^2-R_Q)$$

If magnitude information is discarded, a sign blind algorithm is developed as follows.

$$\text{Sign }\epsilon(t)=(\text{sign}Y_R-j\,\text{sign}Y_I)[\text{sign }(Y_R^2+Y_I^2-R_Q)]$$

In an FIR filter, depending upon the error signal which is used in the iterative update equation, the coefficient update equation can be used to cause the complex coefficients to be updated in several different ways. The all blind algorithm provides one method for error signal assignment. The blind algorithm is useful when the receiver is unsure which symbol is actually being transmitted and the probability that the received symbol is incorrect is large. The blind algorithm uses the equation shown above to represent the error signal.

The key idea of the blind algorithm is that the output of the decision device does not enter into the error computation at all. The blind algorithm produces its error signal based only upon the received sample as it compares to a programmable constant $R_Q$. Using the blind algorithm, the correctness or incorrectness of the decision device's output is not relevant to the generation of the error signal ε; thus, the blind algorithm works well upon initialization when most of the decisions are incorrect.

In the above equations, $R_Q$ is a constant based upon the constellation pattern. The error signal ε(t) is assigned independently of the decision which was made as to which receive symbol was received. The name "blind" is used because the algorithm is blind as to the received symbol. The blind algorithm is robust over many channel impairments. This indicates that it will converge for many different types of channel impairments. However, the blind algorithm is slow, and once it has converged, tends to misadjust the filter tap coefficients. This misadjustment is caused by introducing a large error based upon the magnitude of a correct constellation point when the correct error should be essentially zero. A large error signal is introduced when a received sample Y(t) is correctly received in close proximity to a high magnitude constellation point.

An alternative to the blind algorithm is a decision directed algorithm, in which the ε(t) error signal is assigned according to interpreted constellation point according to the following equation.

$$\epsilon(t)=Y-D\qquad\text{(Decision Directed)}$$

If the magnitude information is discarded in the above equation by taking the sign, the following sign decision directed algorithm is developed.

$$\text{Sign }\epsilon(t)=\text{sign}(Y-D)$$

By separating the above equation into real and imaginary parts, the following equation is derived.

$$\text{Sign }\epsilon(t)=\text{sign}(Y_R-D_R)+j\,\text{sign}(Y_I-D_I)$$

Figure 1:
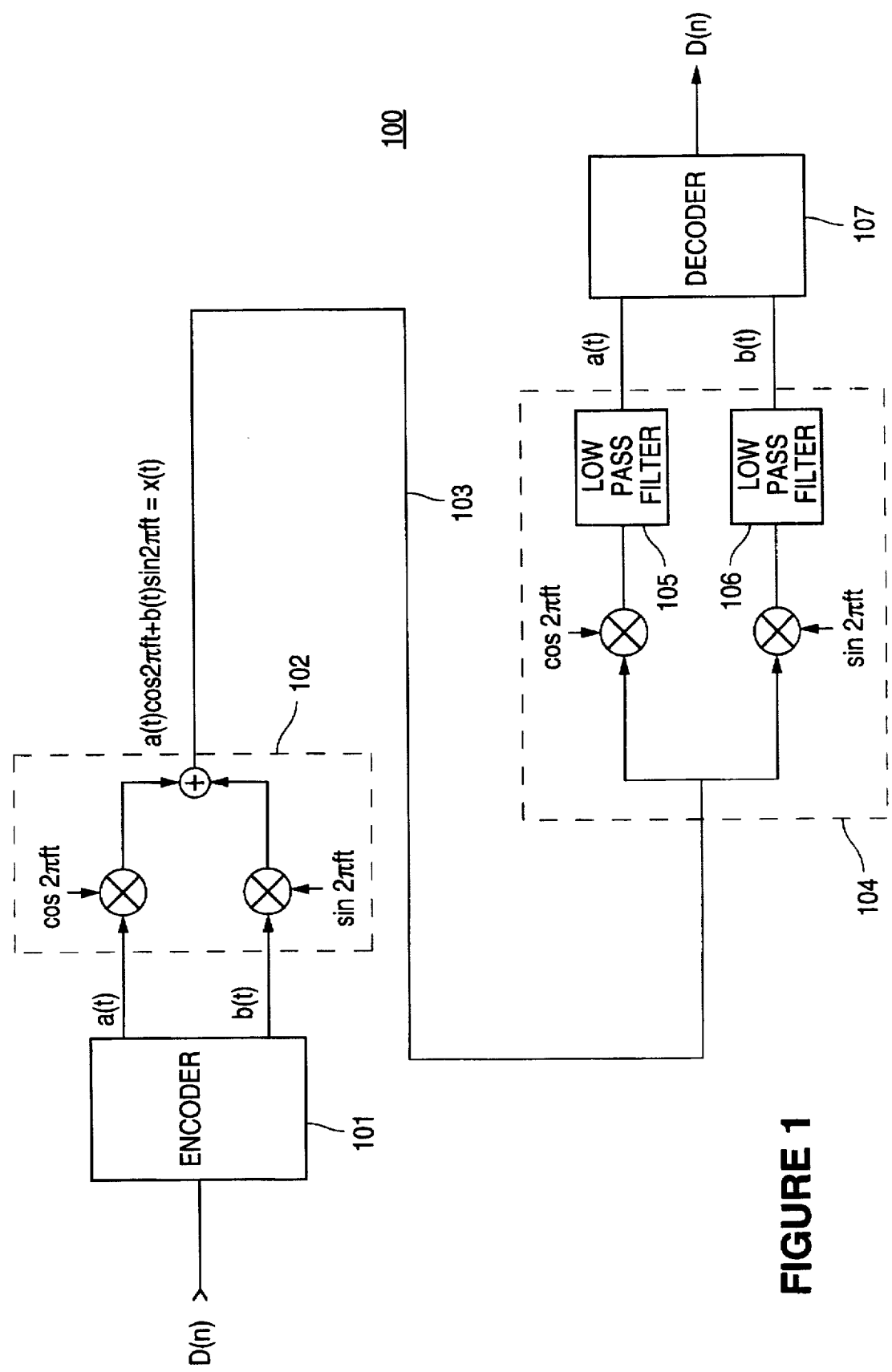
FIG. 1 illustrates quadrature amplitude modulation and demodulation as a means of transmitting and receiving digital information.
Figure 4:
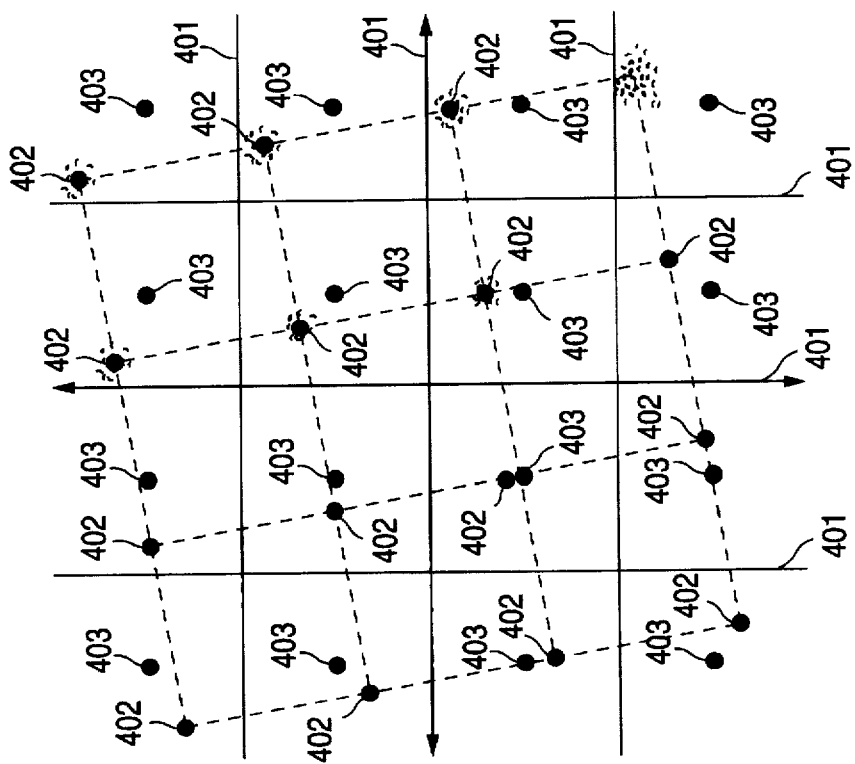
FIG. 4 illustrates the decision regions, constellation points, and received sample clusters received when a minor uncorrected channel impairment influences the output of a sixteen QAM constellation.
Figure 3:
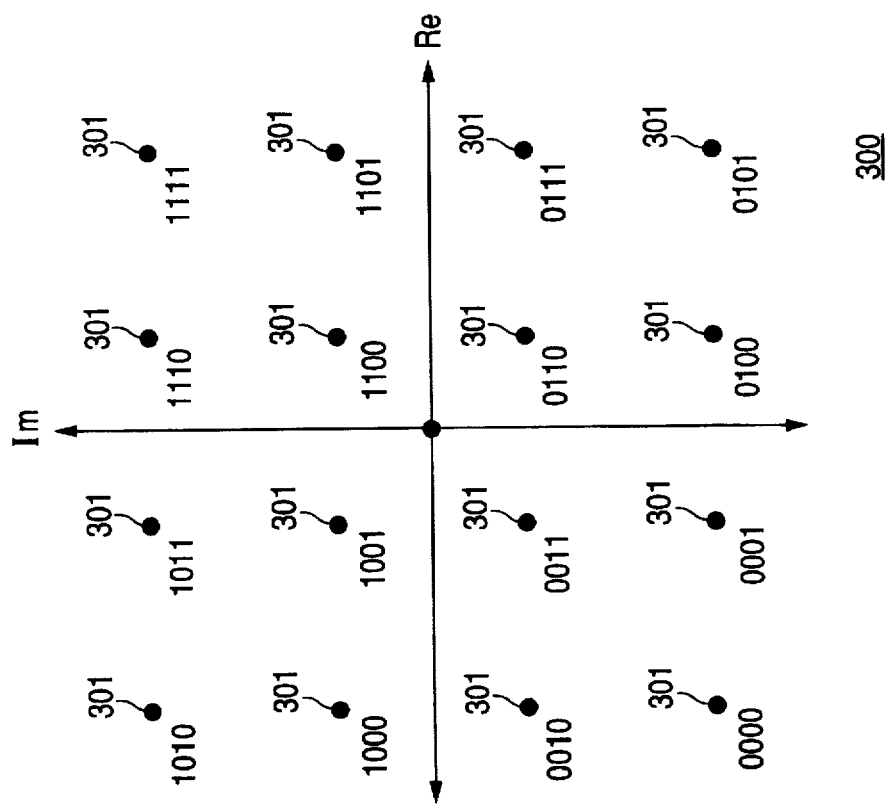
FIG. 3 illustrates a typical binary coding of constellation points in a 16 point QAM constellation pattern in the complex plane, where each symbol represents four bits worth of information.

A decision directed algorithm would be most effective with a channel impairment such as shown in FIG. 4. In FIG. 4, although the received samples are, on average, predictably divergent from their correct constellation points, each of the received samples 402 are nonetheless still within the correct decision regions bounded by lines 401 so that the correct constellation points 403 are located. Because this algorithm supplies exact error data when the decisions are correct, it is very fast in tracking. It assigns the actual divergence from the correct symbol as the error signal ε(t), thus is very fast in tracking changing minor channel impairments. However, decision based algorithms depend upon the correct decision being made for each sample; it is not robust upon initialization; and it will not converge given the existence of severe channel impairments. Upon initialization, if the correct symbols are not received, then the error signal ε(t) going through the coefficient update equation will be incorrect. Therefore, the coefficients will not necessarily be adjusted toward their correct values, and it is very likely that the system will never converge.

As alternatives to the blind or decision directed algorithms, a combination of these algorithms can be used where, upon initialization, the blind algorithm is used for a predetermined fixed amount of time that could be obtained from a timer for example. After the timer expires, the decision directed algorithm takes over and dominates from there onward. This approach has the benefit that it is robust upon initialization because the blind algorithm is used. Once the timer expires, it is very fast tracking and has almost no misadjustment in the error signal as long as convergence is obtained.

However, there is a problem in that if the time counted by the timer which governs the switching between the blind and the decision directed algorithms is made too long, then the problems of the blind algorithm persist for the entire duration of the timer even if convergence is obtained prior to the expiration of the timer. In contrast, if a short timer setting is used, then the system may switch to the decision directed algorithm before convergence has been obtained, thereby preventing convergence from ever being obtained. This combined approach also has the disadvantage that the overall speed of the convergence is not proportional to channel impairments but rather is merely a function of the timer. Additionally, there is no provision to switch back to the blind algorithm if the channel impairment changes such that it causes the decision directed algorithm to produce incorrect results when the received sample no longer fall within the correct decision regions.

Another way to combine the blind and decision directed algorithms is based upon the use of a detection or control circuit rather than a timer. This has the benefits of the robust start up of the blind algorithm and it has the benefit of the fast tracking and low misadjustment of the error signal $\epsilon(t)$ during decision directed mode. If the decision directed algorithm fails, it changes back to the blind algorithm. The problem with this combined approach using a detection circuit is the cost of the extra circuitry for the detection and control. Moreover, some channel impairments can prevent the system from ever switching to the decision directed mode, and therefore the receiver will suffer the slow convergence and high misadjustments of the blind algorithm indefinitely. Furthermore, even if the decision directed algorithm is reached, switching from the decision directed algorithm back to the blind algorithm will not occur until after the damage has already been irreversibly done to the equalization coefficients.

Figure 13:
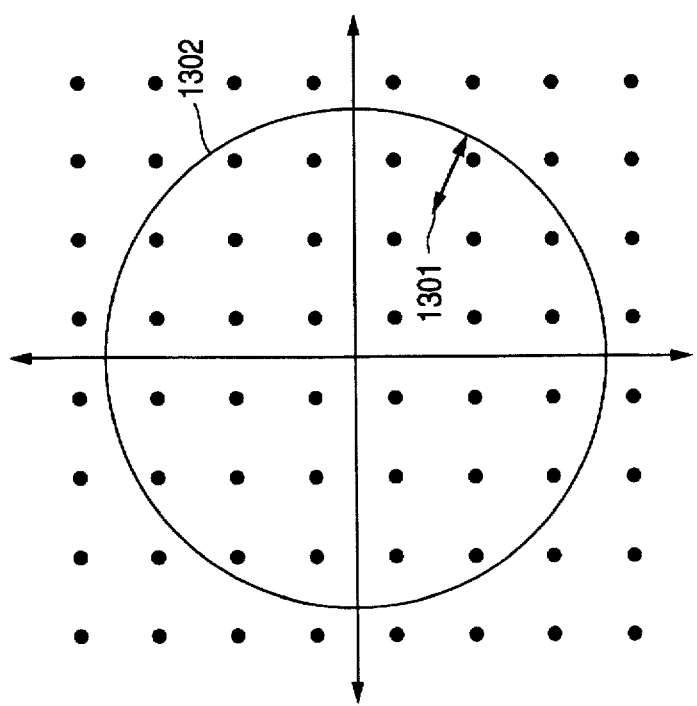
FIG. 13 illustrates a sixty-four point QAM constellation and an output magnitude threshold $R_Q$ used in to calculate the error signal using the blind algorithm.

FIG. 13 illustrates a sample point 1301 in a sixty four QAM constellation being compared to an output magnitude threshold $R_Q$ 1302, as occurs in the blind algorithm.

Figure 14:
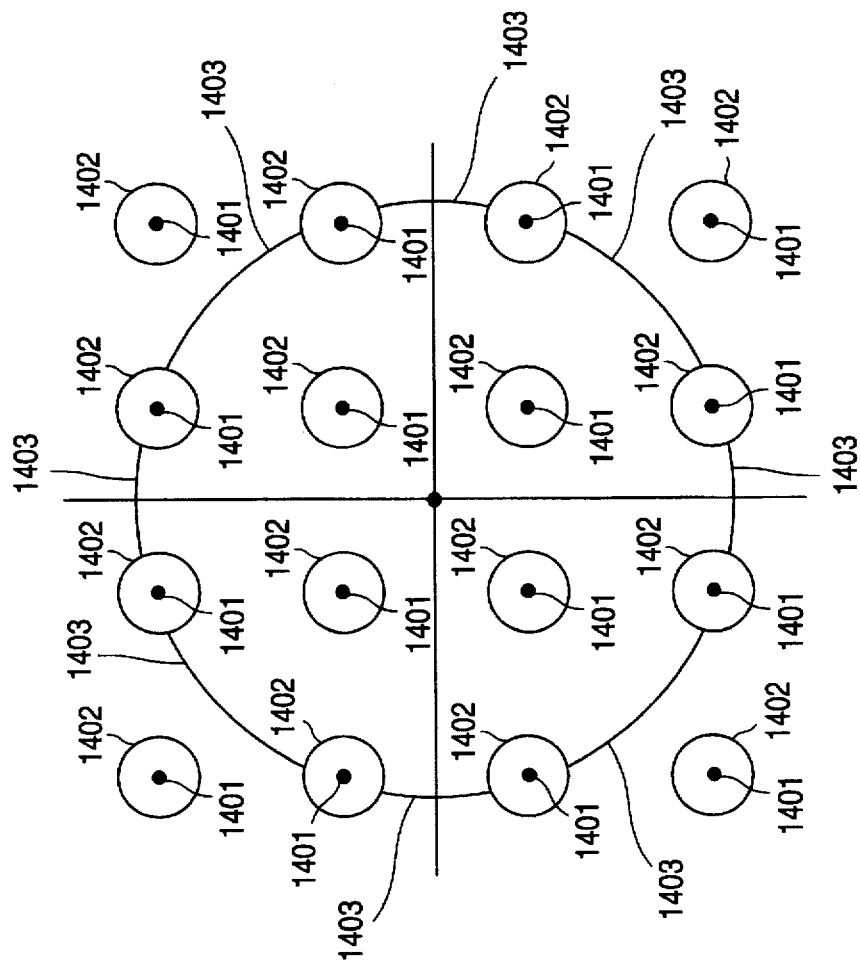
FIG. 14 illustrates a sixteen point QAM constellation, where each constellation point has a circular area of radius T surrounding it. When sample within the circles are received, the decision based error computation is performed, otherwise the blind error computation is performed.

FIG. 14 illustrates the fourth aspect of the present invention. According to a fourth aspect of the present invention, the error signal $\epsilon(t)$ is assigned a decision based difference when the sample is geometrically close to one of the constellation points in the complex plane, and is assigned a blind based difference when the received sample point is not near any one of the constellation points; and in addition, the eight-point quantization according to the first aspect and shown in FIG. 9 and the table above is applied to the error signal. In FIG. 14, the constellation points 1401 are surrounded by areas 1402 of radius T. These represent circular areas for which decision based quantization of the error Q8(Y−D) is performed according to the first aspect of the present invention. For any sample received in a point not enclosed by one of the sixteen circles 1402, the error E is quantized through the blind algorithm $Q8[Y^*\text{sign}(|Y|^2-R)]$ according to the first aspect of the present invention. The magnitude constant $R_Q$ based upon the constellation is illustrated in FIG. 14 as the disjointed circle 1403. The circle 1403 does not extend through the circular decision based areas 1402 because the blind algorithm in not being applied for samples which are received in the areas 1402. For samples received within the decision based regions 1402, the Q8(Y−D) quantization is performed. For samples outside the regions 1402, the $Q8[Y^*\text{sign}(|Y|^2-R)]$ quantization is performed.

$$\epsilon(t) = \begin{cases} Y-D & \text{for} |Y-D|^2 < T \\ Y \cdot \text{sign}(|Y|^2-R_Q) & \text{for} |Y-D|^2 \geq T \end{cases}$$

The above manner of assigning the error signal according to the fourth aspect of the present invention uses a combination of the blind algorithm and the sign blind algorithm in the area outside the regions 1402 in FIG. 14. The full resolution of Y is adjusted by the sign of the magnitude comparison between Y and $R_Q^{1/2}$. The resolution of the magnitude comparison is sacrificed as in the sign blind algorithm, whereas the resolution of the output value Y is maintained as in the blind algorithm. The particular blind algorithm used according to the fourth aspect of the present invention has the advantage of being phase invariant, which means that carrier frequency recovery need not be locked for the algorithm to function properly.

The above values for $\epsilon(t)$ are plugged into the coefficient update equation below to implement the fourth aspect of the present invention.

$$W_i(t+1) = W_i(t) - 2^{-m} \cdot Q8(\epsilon_i) \cdot X_i^*$$

This fourth aspect is very valuable in that the switching from blind to decision directed and from decision directed to blind is performed on a sample by sample basis. The receiver error calculation 211 (in FIG. 2) is never completely in a single mode. Moreover, the statistics of the actually received symbols determine which mode will dominate. When equalization is poor, the blind algorithm will dominate. When equalization is good, decision directed will dominate. The decision directed error threshold T can be programmed to a variety of levels. If the distance between point is S, then the threshold T can be set to a value equal to or greater than S divided by the square root of two, having the effect that the decision directed algorithm will dominate for all samples within the constellation, and the blind will dominate in remote areas away from the constellation. If the threshold T is set to be very small, the blind algorithm will govern all the areas except for the small circular areas surrounding the constellation points.

Programmability of the raw error threshold T is important in a noisy environment, for example, when a known channel impairment is being successfully equalized, and yet there is no escape from a significant amount of random white noise which scatters the clusters of received samples around the constellation points.

Figure 15:
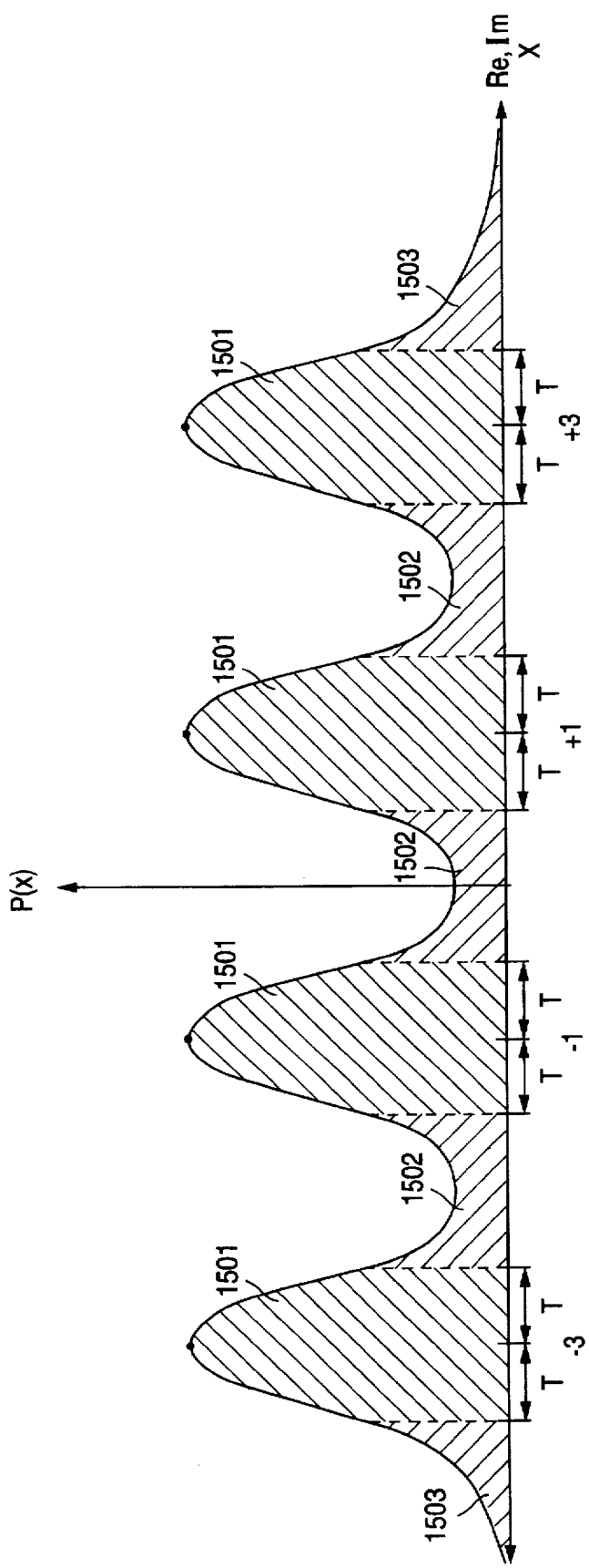
FIG. 15 illustrates a probability distribution of a sample point along a real or imaginary cross section of the complex plane. The cross sectional plane includes the line connecting a rank of the constellation points.

FIG. 15 illustrates a probability distribution for a random sample communicated with significant Guassian white noise. The areas 1501 illustrate areas where received samples are governed by decision based error computation. Areas 1502 are outside the raw error threshold T, thus the blind error computation applies. The Guassian tails 1503 are governed by the blind algorithm. The cross section shown in FIG. 15 applies where the plane of the paper intersects the centers of the circular decision based areas 1402. (For example, FIG. 15 is the graph of P(Im[X]) at Re[X]=1.) If the plane of the paper were midway between collinear ranks of constellation points, the entire cross-section would be blind for thresholds less than distance between constellation points divided by two; for thresholds greater than S divided by the square root of two, the areas 1502 would be eliminated, while the tails 1503 would remain. (For example, if FIG. 15 illustrated P(Re[X]) at Im[X]=2.) The total probability under areas 1502 and 1503 illustrated in FIG. 15 represents a dense constellation in a noisy environment. In a real application, the peaks of areas 1501 would typically be higher, and the valleys in areas 1502 would be much lower.

While the present invention has been disclosed with particular reference to its preferred embodiment, that embodiment is presented by way of example, not by way of limitation. Those of ordinary skill in the art would be enabled by this disclosure to add to or modify the embodiment of the present invention in various ways as needed and still be within the scope and spirit of various aspects of the present invention as recited in the appended claims. Accordingly, various changes and modifications which are obvious to a person skilled in the art to which the invention pertains are deemed to lie within the spirit and scope of the invention as claimed.

What is claimed is:

1. A method of quantizing a measured complex error signal to supply a quantized complex error signal, the measured complex error signal including a measured real error component and a measured imaginary error component, the measured complex error signal being defined by a measured error magnitude and a measured error phase angle in a two-dimensional complex plane, the quantized complex error signal including a quantized real error component and a quantized imaginary error component, comprising the steps of:

assigning a third predetermined correction value to the quantized real error component and assigning a first predetermined correction value to the quantized imaginary error component when the measured complex error signal is in a first area of the complex plane;

assigning a second predetermined correction value to the quantized real error component and assigning the second predetermined correction value to the quantized imaginary error component when the measured complex error signal is in a second area of the complex plane;

assigning the first predetermined correction value to the quantized real error component and assigning the third predetermined correction value to the quantized imaginary error component when the measured complex error signal is in a third area of the complex plane;

assigning a negative of the second predetermined correction value to the quantized real error component and assigning the second predetermined correction value to the quantized imaginary error component when the measured complex error signal is in a fourth area of the complex plane;

assigning a negative of the third predetermined correction value to the quantized real error component and assigning a first predetermined correction value to the quantized imaginary error component when the measured complex error signal is in a fifth area of the complex plane;

assigning the negative of the second predetermined correction value to the quantized real error component and assigning the negative of the second predetermined correction value to the quantized imaginary error component when the measured complex error signal is in a sixth area of the complex plane;

assigning the first predetermined correction value to the quantized real error component and assigning the negative of the third predetermined correction value to the quantized imaginary error component when the measured complex error signal is in a seventh area of the complex plane; and assigning the second predetermined correction value to the quantized real error component and assigning the negative of the second predetermined correction value to the quantized imaginary error component when the measured complex error signal is in an eighth area of the complex plane.

2. A method as in claim 1, wherein the first, second, third, fourth, fifth, sixth, seventh, and eighth areas completely occupy the complex plane.

3. A method as in claim 2, wherein each of the first, second, third, fourth, fifth, sixth, seventh, and eighth areas is infinite, contiguous, and does not overlap any of the other seven areas of the complex plane.

4. A method as in claim 3, wherein the first area is adjacent to the second area,
wherein the second area is adjacent to the third area,
wherein the third area is adjacent to the fourth area,
wherein the fourth area is adjacent to the fifth area,
wherein the fifth area is adjacent to the sixth area,
wherein the sixth area is adjacent to the seventh area,
wherein seventh area is adjacent to the eighth area, and
wherein the eighth area is adjacent to the first area.

5. A method as in claim 4, wherein each of the eight areas is defined by a lower and an upper ray originating from an origin of the complex plane.

6. A method as in claim 5, wherein the first upper and second lower ray is at $\pi/8$,
wherein the second upper and third lower ray is at $3\pi/8$,
wherein the third upper and fourth lower ray is at $5\pi/8$,
wherein the fourth upper and fifth lower ray is at $7\pi/8$,
wherein the fifth upper and sixth lower ray is at $9\pi/8$,
wherein the sixth upper and seventh lower ray is at $11\pi/8$,
wherein the seventh upper and eighth lower ray is at $13\pi/8$, and
wherein the eighth upper and first lower ray is at $15\pi/8$.

7. A method as in claim 1, wherein the first predetermined correction value is zero, and
wherein the third predetermined correction value is one and one-half times the second predetermined correction value.

8. A method as in claim 7, wherein the second predetermined correction value is one, and the third predetermined correction value is one and one-half.

9. A method as in claim 1, wherein the measured complex error signal has a continuous function domain.

10. A method as in claim 1, wherein the measured complex error signal has a discrete function domain with a fixed precision.

11. A method of performing an eight-point quantization of a measured complex error signal to supply a quantized complex error signal being defined by one of eight possible complex correction constellations, the measured complex error signal including a measured real error component and a measured imaginary error component, the measured complex error signal being defined by a measured error magnitude and a measured error phase angle in a two-dimensional complex plane, the quantized complex error signal including a quantized real error component and a quantized imaginary error component, comprising the steps of:

multiplying the measured complex error signal by $e^{j\pi/8}$ to provide a first complex decision value having a first decision value real component and a first decision value imaginary component;

multiplying the measured complex error signal by $e^{-j\pi/8}$ to provide a second complex decision value having a second decision value real component and a second decision value imaginary component;

performing a sign operation on the first and second complex decision values to produce a first real sign, a first imaginary sign, a second real sign, and a second imaginary sign;

assigning a first constellation to the quantized complex error signal, when the first real sign is positive, the second real sign is positive, and the first imaginary sign is opposite of the second imaginary sign;

assigning a second constellation to the quantized complex error signal, when the first real sign is positive, the second real sign is positive, the first imaginary sign is positive, and the second imaginary sign is positive;

assigning a third constellation to the quantized complex error signal, when the first real sign and second real sign are opposite, the first imaginary sign is positive, and the second imaginary sign is positive;

assigning a fourth constellation to the quantized complex error signal, when the first real sign is negative, the second real sign is negative, and the first imaginary sign is positive, and the second imaginary sign is positive;

assigning a fifth constellation to the quantized complex error signal, when the first real sign is negative, the second real sign is negative, and the first imaginary sign is opposite of the second imaginary sign;

assigning a sixth constellation to the quantized complex error signal, when the first real sign is negative, the second real sign is negative, the first imaginary sign is negative, and the second imaginary sign is negative;

assigning a seventh constellation to the quantized complex error signal, when the first real sign is opposite from the second real sign, the first imaginary sign is negative, and the second imaginary sign is negative; and assigning an eighth constellation to the quantized complex error signal, when the first real sign is positive, the second real sign is positive, the first imaginary sign is negative, and the second imaginary sign is negative.

12. A method as in claim 11;

wherein the first constellation consists of a third predetermined correction value as real part and a first predetermined correction value as imaginary part;

wherein the second constellation consists of a second predetermined correction value as real part and the second predetermined correction value as imaginary part;

wherein the third constellation consists of the first predetermined correction value as real part and the third predetermined correction value as imaginary part;

wherein the fourth constellation consists of a negative of the second predetermined correction value as real part and the second predetermined correction value as imaginary part;

wherein the fifth constellation consists of a negative of the third predetermined correction value as real part and the first predetermined correction value as imaginary part;

wherein the sixth constellation consists of the negative of the second predetermined correction value as real part and the negative of the second predetermined correction value as imaginary part;

wherein the seventh constellation consists of the first predetermined correction value as real part and the negative of the third predetermined correction value as imaginary part; and wherein the eighth constellation consists of the second predetermined correction value as real part and the negative of the second predetermined correction value as imaginary part.

13. A method as in claim 12, wherein the first predetermined correction value is zero, and wherein the third predetermined correction value is one and one-half times the second predetermined correction value.

14. A method as in claim 13, wherein the second predetermined correction value is one, and the third predetermined correction value is one and one-half.

15. A method as in claim 11, wherein the steps of multiplying the measured complex error signal by $e^{j\pi/8}$ and by $e^{-j\pi/8}$ are performed by:

multiplying the measured real error component by a cosine of $\pi/8$ to supply a positive real component;

multiplying the measured imaginary error component by a sine of $\pi/8$ to supply a negative real component;

multiplying the measured real error component by the sine of $\pi/8$ to supply a first positive imaginary component;

multiplying the measured imaginary error component by the cosine of $\pi/8$ to supply a second positive imaginary component;

subtracting the negative real component from the positive real component to produce the first decision value real component;

adding the positive real component to the negative real component to produce the second decision value real component;

adding the first positive imaginary component to the second positive imaginary component to produce the first decision value imaginary component; and subtracting the first positive imaginary component from the second positive imaginary component to produce the second decision value imaginary component.

16. A method as in claim 15, wherein the cosine of $\pi/8$ is precomputed and stored as approximately 0.923879533, and the sine of $\pi/8$ is precomputed and stored as approximately 0.382683432.

17. A method of deriving a quantized complex error signal from a complex output signal and a complex decision constellation, the quantized complex error signal including a quantized real error component and a quantized imaginary error component, comprising the steps of:

computing a raw error scaler monotonically related to a magnitude difference between the complex output signal and the complex decision constellation;

comparing the raw error scaler to a raw error threshold;

subtracting the complex decision constellation from the complex output signal to provide a measured complex error signal when the raw error scaler is less than the raw error threshold, assigning the complex output signal to the measured complex error signal when the raw error scaler is greater than the raw error threshold, and wherein the measured complex error signal consists of a measured real error component and a measured imaginary error component, the measured complex error signal being defined by a measured error magnitude and a measured error phase angle in a two-dimensional complex plane;

assigning a third predetermined correction value to the quantized real error component and assigning a first predetermined correction value to the quantized imaginary error component when the measured complex error signal is in a first area of the complex plane;

assigning a second predetermined correction value to the quantized real error component and assigning the second predetermined correction value to the quantized imaginary error component when the measured complex error signal is in a second area of the complex plane;

assigning the first predetermined correction value to the quantized real error component and assigning the third predetermined correction value to the quantized imaginary error component when the measured complex error signal is in a third area of the complex plane;

assigning a negative of the second predetermined correction value to the quantized real error component and assigning the second predetermined correction value to the quantized imaginary error component when the measured complex error signal is in a fourth area of the complex plane;

assigning a negative of the third predetermined correction value to the quantized real error component and assigning a first predetermined correction value to the quantized imaginary error component when the measured complex error signal is in a fifth area of the complex plane;

assigning the negative of the second predetermined correction value to the quantized real error component and assigning the negative of the second predetermined correction value to the quantized imaginary error component when the measured complex error signal is in a sixth area of the complex plane;

assigning the first predetermined correction value to the quantized real error component and assigning the negative of the third predetermined correction value to the quantized imaginary error component when the measured complex error signal is in a seventh area of the complex plane;

assigning the second predetermined correction value to the quantized real error component and assigning the negative of the second predetermined correction value to the quantized imaginary error component when the measured complex error signal is in an eighth area of the complex plane; and if the raw error scaler is greater than the raw error threshold,
computing an output magnitude scaler monotonically related to a magnitude of the complex output signal,
comparing the output magnitude scaler to an output magnitude threshold, and
reversing a sign of the quantized complex error signal when the output magnitude scaler is greater than the output magnitude threshold.

18. A method as in claim 17,
wherein the complex output signal consists of a real output component and an imaginary output component;
wherein the complex decision constellation consists of a real constellation component and an imaginary constellation component;
wherein the step of computing a raw error scaler is performed by:
subtracting the real constellation component from the real output component to provide a real error magnitude component;
subtracting the imaginary constellation component from the imaginary output component to provide an imaginary error magnitude component;
multiplying the real error magnitude component by itself to supply a squared real error magnitude component;
multiplying the imaginary error magnitude component by itself to supply a squared imaginary error magnitude component; and
adding the squared real error magnitude component and the squared imaginary error magnitude component to supply the raw error scaler.

19. A method as in claim 17,
wherein the step of computing an output magnitude scaler is performed by:
multiplying the real output component by itself to supply a squared real output magnitude component;
multiplying the imaginary output component by itself to supply a squared imaginary output magnitude component; and
adding the squared real output magnitude component and the squared imaginary output magnitude component to supply the output magnitude scaler.

20. A method as in claim 17,
wherein the raw error threshold is less than the output magnitude threshold.

21. A method as in claim 17, wherein the first, second, third, fourth, fifth, sixth, seventh, and eighth areas completely occupy the complex plane.

22. A method as in claim 21, wherein each of the first, second, third, fourth, fifth, sixth, seventh, and eighth areas is infinite, contiguous, and does not overlap any of the other seven areas of the complex plane.

23. A method as in claim 22,
wherein the first area is adjacent to the second area,
wherein the second area is adjacent to the third area,
wherein the third area is adjacent to the fourth area,
wherein the fourth area is adjacent to the fifth area,
wherein the fifth area is adjacent to the sixth area,
wherein the sixth area is adjacent to the seventh area,
wherein seventh area is adjacent to the eighth area, and
wherein the eighth area is adjacent to the first area.

24. A method as in claim 23, wherein each of the eight areas is defined by a lower and an upper ray originating from an origin of the complex plane.

25. A method as in claim 24,
wherein the first upper and second lower ray is at $\pi/8$,
wherein the second upper and third lower ray is at $3\pi/8$,
wherein the third upper and fourth lower ray is at $5\pi/8$,
wherein the fourth upper and fifth lower ray is at $7\pi/8$,
wherein the fifth upper and sixth lower ray is at $9\pi/8$,
wherein the sixth upper and seventh lower ray is at $11\pi/8$,
wherein the seventh upper and eighth lower ray is at $13\pi/8$,
and
wherein the eighth upper and first lower ray is at $15\pi/8$.

26. A method as in claim 17,
  wherein the first predetermined correction value is zero, and
  wherein the third predetermined correction value is one and one-half times the second predetermined correction value.

27. A method as in claim 26, wherein the second predetermined correction value is one, and the third predetermined correction value is one and one-half.

28. A method as in claim 17, wherein the measured complex error signal has a continuous function domain.

29. A method as in claim 17, wherein the measured complex error signal has a discrete function domain with a fixed precision.

30. A complex coefficient update circuit having a complex sample as input including a real sample component and an imaginary sample component, having a complex error signal as input including a real error component and an imaginary error component, the complex error signal having an associated error signal phase angle and an associated error signal magnitude, the circuit comprising:
  a selection signal generator having as inputs the real error component and the imaginary error component and having as outputs an imaginary error sign selection signal, a real error sign selection signal, a rotated real error sign equality selection signal, and a rotated imaginary error sign equality selection signal; and
  an arithmetic logical module having as inputs the real sample component, the imaginary sample component, the imaginary error sign selection signal, the real error sign selection signal, the rotated real error sign equality selection signal, and the rotated imaginary error sign equality selection signal, having as outputs a real coefficient correction value and an imaginary coefficient correction value;
  wherein the selection signal generator asserts the real error sign selection signal if the real error component is negative and deasserts the real error sign selection signal if the real error component is positive;
  wherein the arithmetic logical module outputs the real coefficient correction value equal to one and one-half times the real sample component, one and one-half times the imaginary sample component, negative one and one-half times the real sample component, negative one and one-half times the imaginary sample component, the real sample component plus the imaginary sample component, negative sum of the real sample component plus the imaginary sample component, the real sample component minus the imaginary sample component, or the imaginary sample component minus the real sample component, as selected by the imaginary error sign selection signal, the real error sign selection signal, the rotated imaginary error sign equality selection signal, and the rotated imaginary error sign equality selection signal; and
  wherein the arithmetic logical module outputs the real coefficient correction value equal to one and one-half times the real sample component, one and one-half times the imaginary sample component, negative one and one-half times the real sample component, negative one and one-half times the imaginary sample component, the real sample component plus the imaginary sample component, negative sum of the real sample component plus the imaginary sample component, the real sample component minus the imaginary sample component, or the imaginary sample component minus the real sample component, as selected by the imaginary error sign selection signal, the real error sign selection signal, the rotated real error sign equality selection signal, and the rotated imaginary error sign equality selection signal.

31. A circuit as in claim 30, further comprising:
  a real component shifter, having the real coefficient correction value as input, having a scaled real coefficient correction value as output, for multiplying the real coefficient correction value by a power of two; and
  an imaginary component shifter, having the imaginary coefficient correction value as input, having a scaled imaginary coefficient correction value as output, for multiplying the imaginary coefficient correction value by the power of two.

32. A circuit as in claim 31, further comprising:
  a real coefficient correction adder, having the scaled real coefficient correction value and a current real coefficient component as inputs, and having an updated real coefficient value as outputs; and
  an imaginary coefficient correction adder, having the scaled imaginary coefficient correction value and a current imaginary coefficient component as inputs, and having an updated imaginary coefficient value as outputs.

33. A circuit as in claim 32, further comprising:
  a current real coefficient register, having the updated real coefficient value as input, and having the current real coefficient component as output; and
  a current imaginary coefficient register, having the updated imaginary coefficient value as input, and having the current imaginary coefficient component as output.

34. A circuit as in claim 30;
  wherein the selection signal generator asserts the rotated real error sign selection signal if the imaginary error component is negative and deasserts the imaginary error sign selection signal if the imaginary error component is positive;
  wherein the selection signal generator asserts the rotated real error sign equality selection signal if the error signal phase angle is within a real phase angle range, and deasserts the rotated real error sign equality selection signal if the error signal phase angle is outside the real phase angle range;
  wherein the selection signal generator asserts the rotated imaginary error sign equality selection signal if the error signal phase angle is within an imaginary phase angle range, and deasserts the rotated imaginary error sign equality selection signal if the error signal phase angle is outside the imaginary phase angle range.

35. A circuit as in claim 30, wherein the arithmetic logical module comprises:
  a real component negation unit having the real sample component as input and having a negative real sample component as output for multiplying by negative one;
  an imaginary component negation unit having the imaginary sample component as input and having a negative imaginary sample component as output for multiplying by negative one;
  a real real first multiplexor having the real sample component and the negative real sample component as inputs, having a real real first signal as output, and having the real error sign selection signal as a select input, such that the real real first signal is the real sample component when the real error sign selection signal is asserted and is the negative real sample component when the real error sign selection signal is deasserted;

a real imaginary first multiplexor having the imaginary sample component and the negative imaginary sample component as inputs, having a real imaginary first signal as output, and having the imaginary error sign selection signal as a select input, such that the real imaginary first signal is the imaginary sample component when the imaginary error sign selection signal is asserted and is the negative imaginary sample component when the imaginary error sign selection signal is deasserted;

an imaginary real first multiplexor having the real sample component and the negative real sample component as inputs, having an imaginary real first signal as output, and having the imaginary error sign selection signal as a select input, such that the imaginary real first signal is the real sample component when the imaginary error sign selection signal is asserted and is the negative real sample component when the imaginary error sign selection signal is deasserted;

an imaginary imaginary first multiplexor having the imaginary sample component and the negative imaginary sample component as inputs, having an imaginary imaginary first signal as output, and having the real error sign selection signal as a select input, such that the imaginary imaginary first signal is the imaginary sample component when the real error sign selection signal is asserted and is the negative imaginary sample component when the real error sign selection signal is deasserted;

a real real right shifter, having the real imaginary first signal as input, and having a real real right shifter signal as output;

a real imaginary right shifter, having the real real first signal as input, and having a real imaginary right shifter signal as output;

an imaginary real right shifter, having the imaginary imaginary first signal as input, and having an imaginary real right shifter signal as output;

an imaginary imaginary right shifter, having the imaginary real first signal as input, and having an imaginary imaginary right shifter signal as output;

a real real second multiplexor having the real real first signal and the real real right shifter signal as inputs, having a real real second signal as output, and having the rotated real error sign equality selection signal as a select input, such that the real real second signal is the real real first signal when the rotated real error sign equality selection signal is asserted and is the real real right shifter signal when the rotated real error sign equality selection signal is deasserted;

a real imaginary second multiplexor having the real imaginary right shifter signal and the real imaginary first signal as inputs, having a real imaginary second signal as output, and having the rotated imaginary error sign equality selection signal as a select input, such that the real imaginary second signal is the real imaginary first signal when the rotated imaginary error sign equality selection signal is asserted and is the real imaginary shifter signal when the rotated imaginary error sign equality selection signal is deasserted;

an imaginary real second multiplexor having the imaginary real first signal and the imaginary real right shifter signal as inputs, having an imaginary real second signal as output, and having the rotated imaginary error sign equality selection signal as a select input, such that the imaginary real second signal is the imaginary real first signal when the rotated imaginary error sign equality selection signal is asserted and is the imaginary real right shifter signal when the rotated imaginary error sign equality selection signal is deasserted;

an imaginary imaginary second multiplexor having the imaginary imaginary right shifter signal and the imaginary imaginary first signal as inputs, having an imaginary imaginary second signal as output; and having the rotated real error sign equality selection signal as a select input, such that the imaginary imaginary second signal is the imaginary imaginary right shifter signal when the rotated real error sign equality selection signal is deasserted and is the imaginary imaginary first signal when the rotated real error sign equality selection signal is asserted;

a real adjustment component adder, having the real real second signal and the real imaginary second signal as inputs, and having the real coefficient correction value as output; and an imaginary adjustment component adder, having the imaginary real second signal and the imaginary imaginary second signal as inputs, and having the imaginary coefficient correction value as output.

36. A circuit as in claim 30;

wherein the real phase angle range is $-3\pi/8$ to $+3\pi/8$ and $+5\pi/8$ to $+11\pi/8$; and wherein the imaginary phase angle range is $+\pi/8$ to $+7\pi/8$ and $+9\pi/8$ to $+15\pi/8$.

37. A circuit as in claim 30;

wherein the selection signal generator comprises:

a real real multiplier having the real error component and a cosine constant as inputs and having a real real rotated error signal as output;

an imaginary imaginary multiplier having the imaginary error component and a sine constant as inputs and having an imaginary imaginary rotated error signal as output;

an imaginary real multiplier having the imaginary error component and the cosine constant as inputs and having an imaginary real rotated error signal as output;

a real imaginary multiplier having the real imaginary error component and the sine constant as inputs and having a real imaginary rotated error signal as output;

a real positive rotation sign detecting subtractor having the real real rotated error signal as a positive input and the imaginary imaginary rotated error signal as a negative input and having a real positive rotation sign as output;

an imaginary positive rotation sign detecting adder having the imaginary real rotated error signal and the real imaginary rotated error signal as inputs and having an imaginary positive rotation sign as output;

a real negative rotation sign detecting adder having the real real rotated error signal and the imaginary imaginary rotated error signal as inputs and having a real negative rotation sign as output;

an imaginary negative rotation sign detecting subtractor having the imaginary real rotated error signal as a positive input and the real imaginary rotated error signal as a negative input and having an imaginary negative rotation sign as output;

a real exclusive NOR gate having the real positive rotation sign and the real negative rotation sign as inputs and having the rotated real error sign equality selection signal as output; and an imaginary exclusive NOR gate having the imaginary positive rotation sign and the imaginary negative rotation sign as inputs and having the rotated imaginary error sign equality selection signal as output.

38. A circuit as in claim 30, wherein the complex sample and the complex error signal have continuous function domains.

39. A circuit as in claim 30, wherein the complex sample and the complex error signal have discrete function domains with a fixed precision.

40. A circuit as in claim 35, wherein the real real right shifter, the real imaginary right shifter, the imaginary real right shifter, and the imaginary imaginary right shifter are implemented without active elements using one-bit-shifted connection matrices.

41. A method as in claim 37, wherein the cosine constant is a cosine of $\pi/8$, is precomputed, and is stored as approximately 0.923879533, and the sine constant is a sine of $\pi/8$, is precomputed, and is stored as approximately 0.382683432.

* * * * *

UNITED STATES PATENT AND TRADEMARK OFFICE
CERTIFICATE OF CORRECTION

PATENT NO. : 5,710,793
DATED : January 20, 1998
INVENTOR(S) : Craig Bradley Greenberg It is certified that error appears in the above-identified patent and that said Letters Patent is hereby corrected as shown below:

In Col. 25, lines 54 and 55, delete "imaginary" and replace with --real--.

In Col. 25, line 57, delete "real" and replace with --imaginary--.

In Col. 26, lines 36 and 37, delete "rotated real" and replace with --imaginary--.

Signed and Sealed this

Seventh Day of April, 1998

Attest:

BRUCE LEHMAN

Attesting Officer

Commissioner of Patents and Trademarks